United States Patent
Ito et al.

(10) Patent No.: US 10,469,685 B2
(45) Date of Patent: Nov. 5, 2019

(54) PRINT CONTROL APPARATUS, METHOD FOR CONTROLLING THE SAME, AND STORAGE MEDIUM

(71) Applicant: CANON KABUSHIKI KAISHA, Tokyo (JP)

(72) Inventors: Aya Ito, Tokyo (JP); Junichi Yamakawa, Kashiwa (JP); Yuzo Harano, Sagamihara (JP); Hideaki Ooba, Yokohama (JP); Yusuke Kimura, Abiko (JP); Nobuhiro Kawamura, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/013,693

(22) Filed: Jun. 20, 2018

(65) Prior Publication Data

US 2019/0007571 A1    Jan. 3, 2019

(30) Foreign Application Priority Data

Jun. 30, 2017 (JP) .................................. 2017-128950

(51) Int. Cl.
*H04N 1/00* (2006.01)
*G03G 15/00* (2006.01)

(52) U.S. Cl.
CPC ....... *H04N 1/00724* (2013.01); *G03G 15/502* (2013.01); *H04N 1/00408* (2013.01); *H04N 1/00694* (2013.01); *H04N 1/00708* (2013.01); *G03G 15/6508* (2013.01)

(58) Field of Classification Search
USPC ...................................................... 358/1.14
See application file for complete search history.

(56) References Cited

U.S. PATENT DOCUMENTS

| | | | |
|---|---|---|---|
| 8,213,033 B2 * | 7/2012 | Choi ..................... | G06F 3/1204 358/1.1 |
| 2007/0263242 A1 * | 11/2007 | Takahashi .......... | G03G 15/6508 358/1.14 |

FOREIGN PATENT DOCUMENTS

JP          2009012256 A         1/2009

* cited by examiner

*Primary Examiner* — Neil R McLean
*Assistant Examiner* — Darryl V Dottin
(74) *Attorney, Agent, or Firm* — Canon USA, Inc., IP Division

(57) ABSTRACT

A print control apparatus to communicate with a printing apparatus includes storage, display, setting, and selection units. The storage unit stores identification information of a plurality of sheets in association with stored adjustment values of a plurality of adjustment items. The display unit displays the stored identification information of the plurality of sheets. The setting unit sets, based on a user instruction, the adjustment values of the stored adjustment items. The selection unit selects, based on a user instruction, identification information of one sheet from among the identification information of the plurality of sheets displayed on the display unit. Based on a selection, the display unit displays, in addition to the displayed identification information of the plurality of sheets, at least one of the adjustment items of which set adjustment values are stored from among the adjustment values associated with the selected identification information of the one sheet.

20 Claims, 22 Drawing Sheets

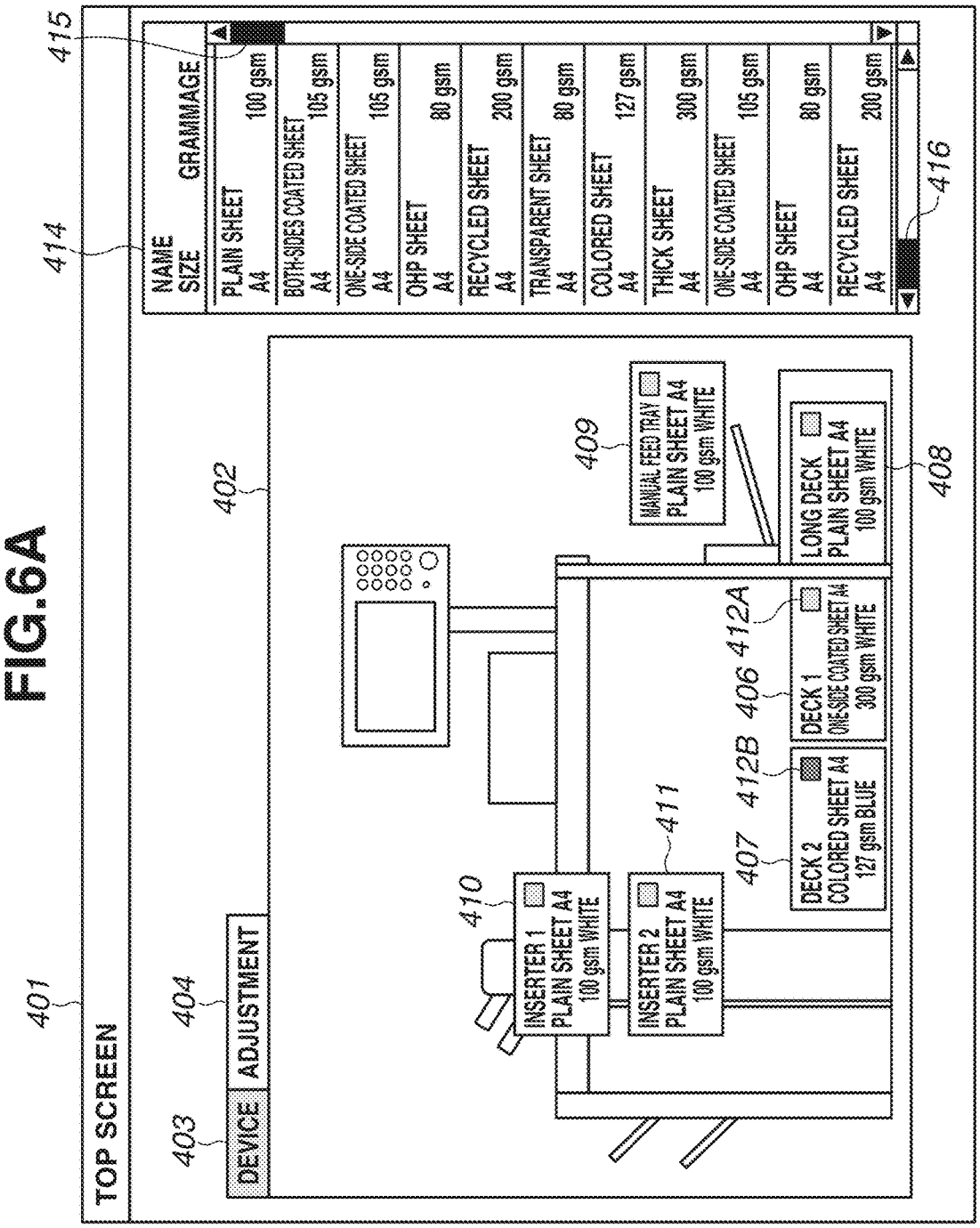

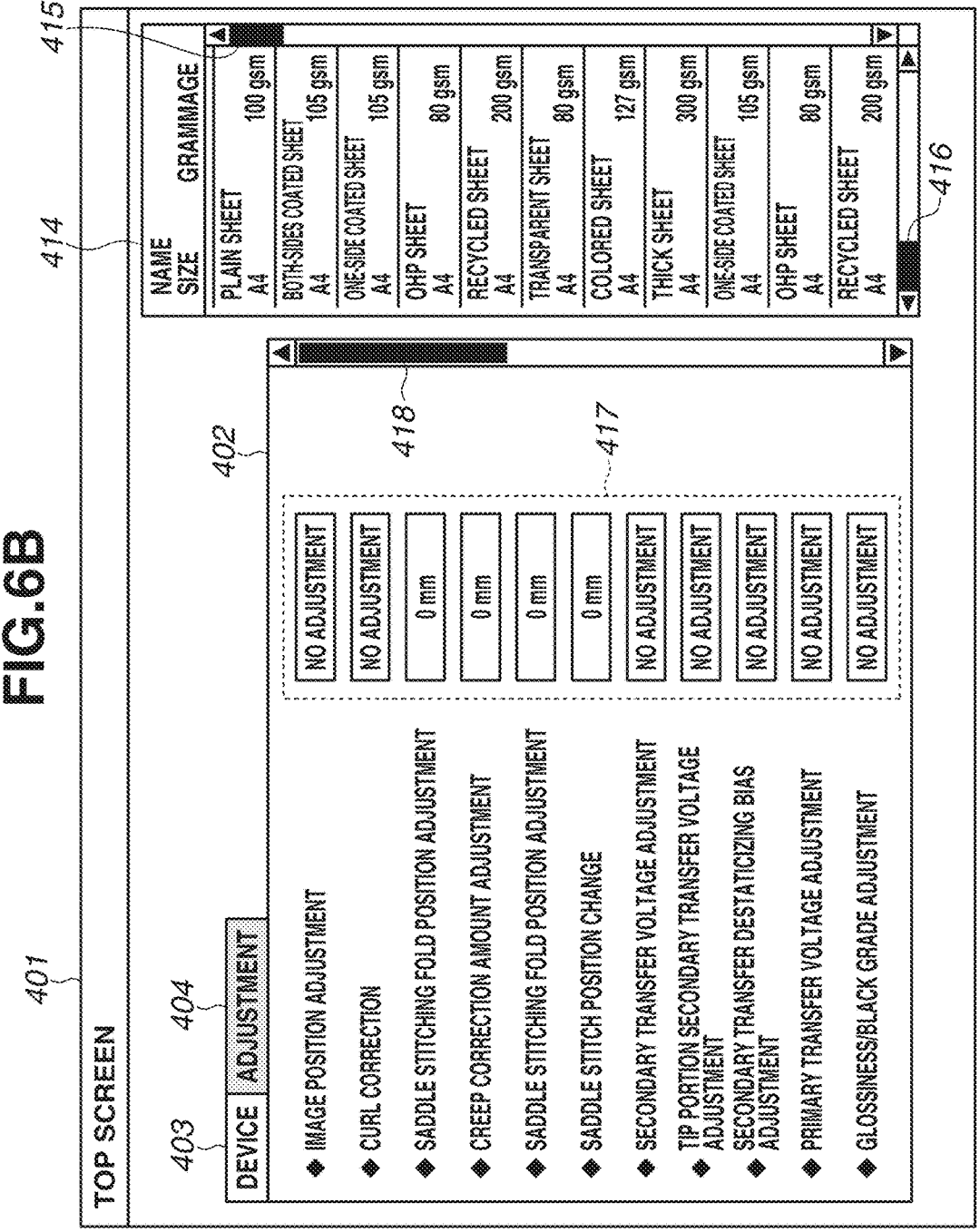

FIG.9

DECK 1

| ASSIGNMENT | UPDATE SHEET LIST | CLOSE |

SHEET INFORMATION
- NAME: THICK SHEET
- GRAMMAGE: 300 g/m²
- SIZE: A4
- SURFACE NATURE: QUALITY SHEET
- FEATURES: NORMAL
- COLOR: WHITE
- SECOND SIDE OF BOTH-SIDES SHEET: NOT PRINTED
- GRAIN: INDEFINITE

- IMAGE POSITION ADJUSTMENT: NO ADJUSTMENT
- CURL CORRECTION: NO ADJUSTMENT
- SADDLE STITCHING FOLD POSITION ADJUSTMENT: 0 mm
- CREEP CORRECTION AMOUNT ADJUSTMENT: 0 mm
- SADDLE STITCHING FOLD POSITION ADJUSTMENT: 0 mm
- SADDLE STITCH POSITION CHANGE: NO ADJUSTMENT
- SECONDARY TRANSFER VOLTAGE ADJUSTMENT: NO ADJUSTMENT
- TIP PORTION SECONDARY TRANSFER VOLTAGE ADJUSTMENT: NO ADJUSTMENT
- SECONDARY TRANSFER DESTATICIZING BIAS ADJUSTMENT: NO ADJUSTMENT
- PRIMARY TRANSFER VOLTAGE ADJUSTMENT: NO ADJUSTMENT

SHEET LIST

| SHEET NAME | GRAMMAGE | SIZE | WIDTH | HEIGHT | SURFACE NATURE | FEATURES | COLOR |
|---|---|---|---|---|---|---|---|
| THICK SHEET | 300 | A4 | 2970 | 2100 | QUALITY SHEET | NORMAL | WHITE |
| BOTH-SIDES COATED SHEET | 105 | A4 | 2970 | 2100 | BOTH-SIDES COATED | NORMAL | WHITE |
| ONE-SIDE COATED SHEET | 105 | A4 | 2970 | 2100 | ONE-SIDE COATED | PUNCH SHEET | WHITE |
| OHP SHEET | 80 | A4 | 2970 | 2100 | OHP | FEATURES | TRANSPARENT |

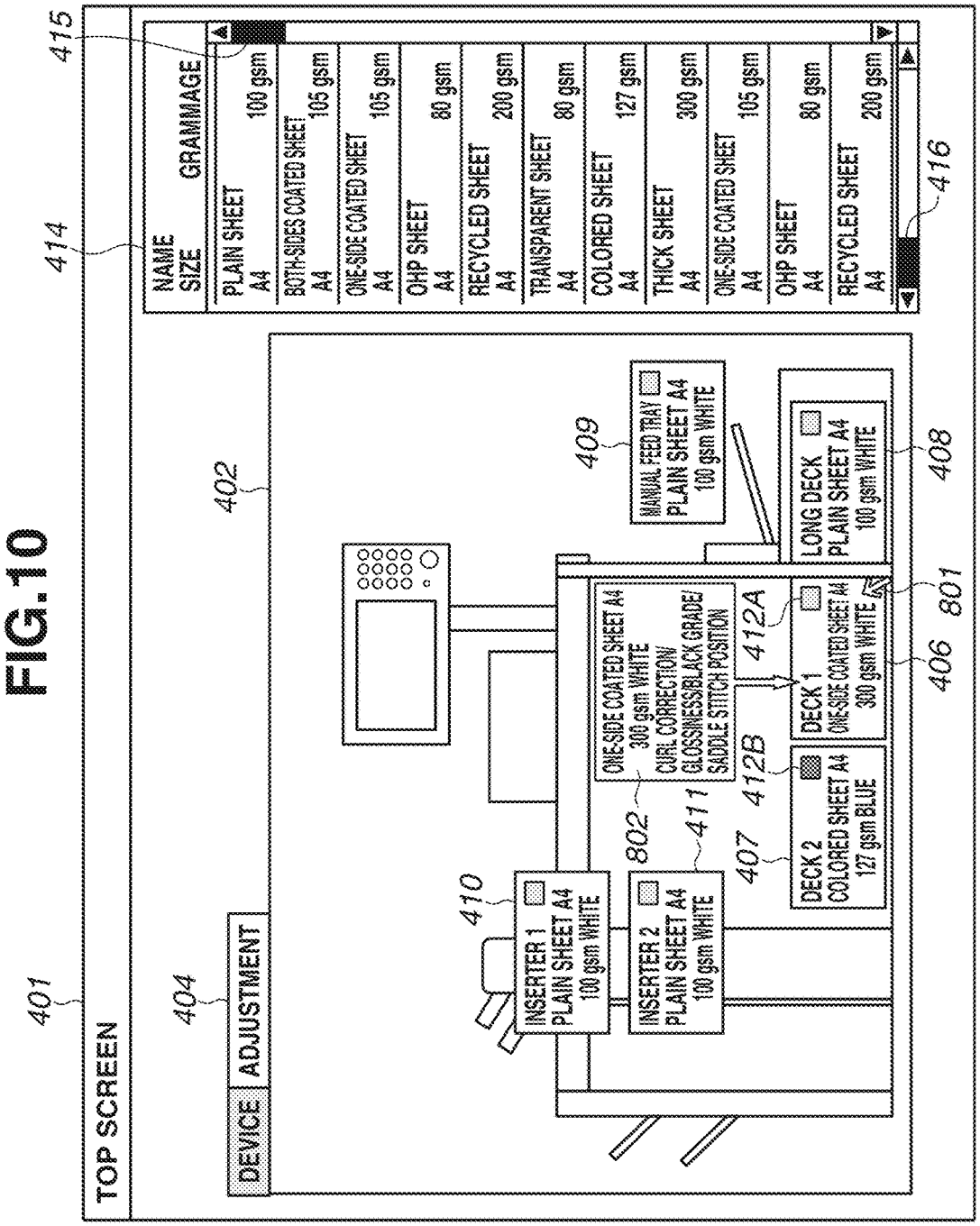

FIG.11

SELECT DISPLAY OF ADJUSTMENT ATTRIBUTES — 901

902

SHEET INFORMATION — 903

- IMAGE POSITION ADJUSTMENT ☑
- CURL CORRECTION ☑
- SADDLE STITCHING FOLD POSITION ADJUSTMENT ☐
- CREEP CORRECTION AMOUNT ADJUSTMENT ☑
- SADDLE STITCHING FOLD POSITION ADJUSTMENT ☐
- SADDLE STITCH POSITION CHANGE ☑
- PUNCH HOLE POSITION CHANGE ☐
- SHEET FAN AIR VOLUME ADJUSTMENT ☑
- REGISTRATION SPEED ADJUSTMENT ☐
- REGISTRATION LOOP AMOUNT ADJUSTMENT ☐
- AUTOMATIC HORIZONTAL REGISTRATION ADJUSTMENT ☐
- IMAGE RUBBING CORRECTION ☐

- SADDLE STITCH POSITION CHANGE ☐
- SECONDARY TRANSFER VOLTAGE ADJUSTMENT ☑
- TIP PORTION SECONDARY TRANSFER VOLTAGE ADJUSTMENT ☑
- SECONDARY TRANSFER DESTATICIZING BIAS ADJUSTMENT ☐
- PRIMARY TRANSFER VOLTAGE ADJUSTMENT ☑
- ITB IMAGE REMOVAL ADJUSTMENT ☐
- GLOSSINESS/BLACK GRADE ADJUSTMENT ☑
- LEADING EDGE/TRAILING EDGE MARGIN ADJUSTMENT ☑
- FIXING PRESSURE ADJUSTMENT ☐
- PRE-FIXING CONVEYANCE FAN AIR VOLUME ADJUSTMENT ☑
- FIXING SPEED ADJUSTMENT ☑
- ENVELOPE FLAP POSITION ☐

904 APPLY   905 CLOSE

FIG. 14

SELECT DISPLAY ORDER OF ADJUSTMENT ITEMS — 1101

SHEET INFORMATION — 1102

| Item | Order (1103) |
|---|---|
| IMAGE POSITION ADJUSTMENT | 5 |
| CURL CORRECTION | 1 |
| SADDLE STITCHING FOLD POSITION ADJUSTMENT | |
| CREEP CORRECTION AMOUNT ADJUSTMENT | |
| SADDLE STITCHING FOLD POSITION ADJUSTMENT | 6 |
| SADDLE STITCH POSITION CHANGE | 3 |
| PUNCH HOLE POSITION CHANGE | |
| SHEET FAN AIR VOLUME ADJUSTMENT | |
| REGISTRATION SPEED ADJUSTMENT | |
| REGISTRATION LOOP AMOUNT ADJUSTMENT | |
| AUTOMATIC HORIZONTAL REGISTRATION ADJUSTMENT | |
| IMAGE RUBBING CORRECTION | |
| SADDLE STITCH POSITION CHANGE | |
| SECONDARY TRANSFER VOLTAGE ADJUSTMENT | 4 |
| TIP PORTION SECONDARY TRANSFER VOLTAGE ADJUSTMENT | |
| SECONDARY TRANSFER DESTATICIZING BIAS ADJUSTMENT | |
| PRIMARY TRANSFER VOLTAGE ADJUSTMENT | 7 |
| ITB IMAGE REMOVAL ADJUSTMENT | |
| GLOSSINESS/BLACK GRADE ADJUSTMENT | 2 |
| LEADING EDGE/TRAILING EDGE MARGIN ADJUSTMENT | |
| FIXING PRESSURE ADJUSTMENT | |
| PRE-FIXING CONVEYANCE FAN AIR VOLUME ADJUSTMENT | |
| FIXING SPEED ADJUSTMENT | |
| ENVELOPE FLAP POSITION | |

APPLY 1104    CLOSE 1105

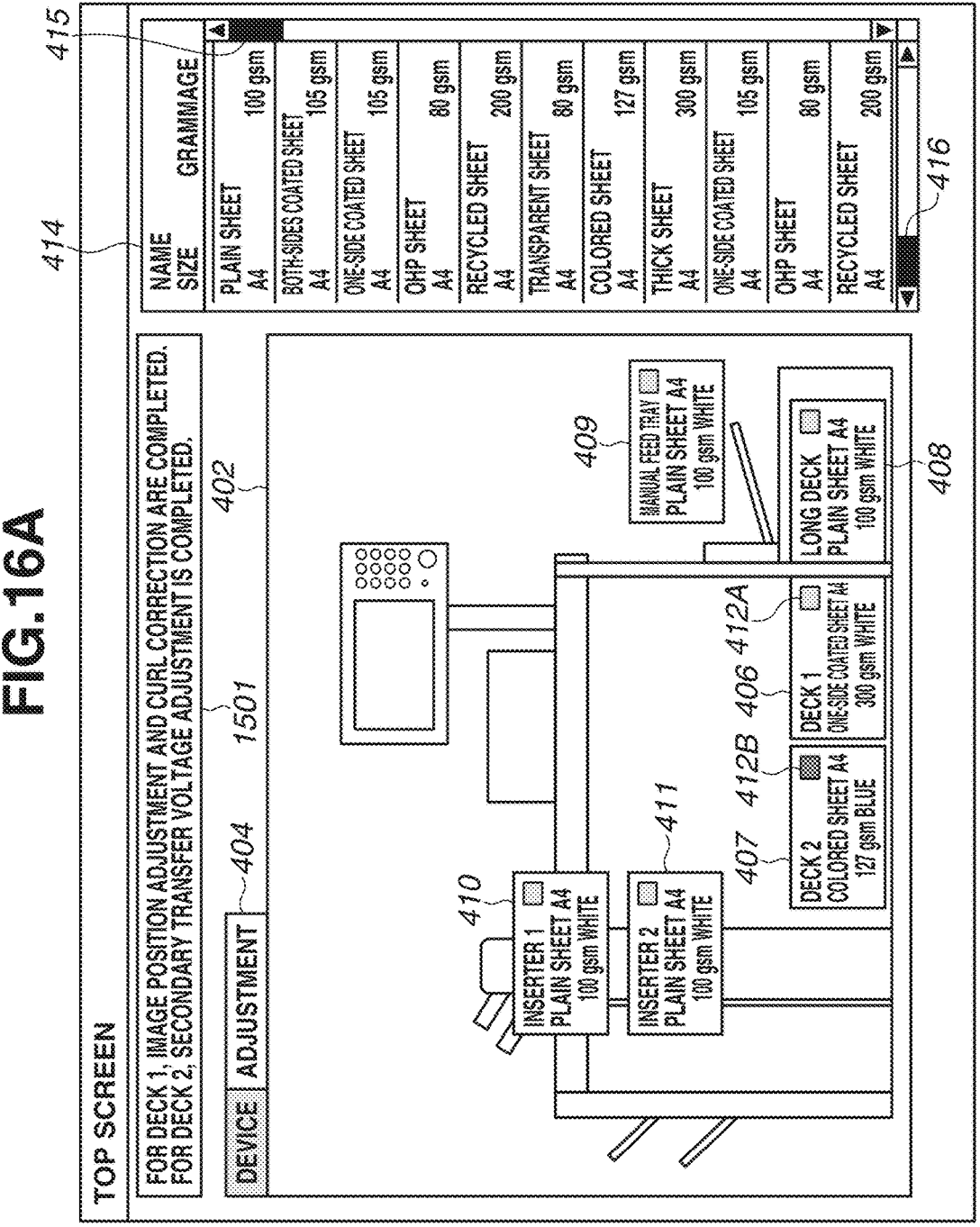

FIG.16B

DECK 1 _701_

| ASSIGNMENT _705_ | UPDATE SHEET LIST _706_ | CLOSE |

IMAGE POSITION ADJUSTMENT AND SECONDARY TRANSFER VOLTAGE ADJUSTMENT ARE COMPLETED. _1602_

SHEET INFORMATION _704_

- NAME — THICK SHEET _702_
- GRAMMAGE — 300 g/m² _707_
- SIZE — A4 _709_ _708_ ◆ COLOR — WHITE _712_
- SURFACE NATURE — QUALITY SHEET _710_ _1601_ ◆ SECOND SIDE OF BOTH-SIDES SHEET — NOT PRINTED _713_
- FEATURES — NORMAL _711_ ◆ GRAIN — INDEFINITE _714_

_1601_

- IMAGE POSITION ADJUSTMENT — ADJUSTMENT POSSIBLE _717_ ◆ SADDLE STITCH POSITION CHANGE — 0 mm _722_
- CURL CORRECTION — NO ADJUSTMENT _718_ ◆ SECONDARY TRANSFER VOLTAGE ADJUSTMENT — ADJUSTMENT POSSIBLE _723_
- SADDLE STITCHING FOLD POSITION ADJUSTMENT — 0 mm _719_ ◆ TIP PORTION SECONDARY TRANSFER VOLTAGE ADJUSTMENT — NO ADJUSTMENT _724_
- CREEP CORRECTION AMOUNT ADJUSTMENT — 0 mm _720_ ◆ SECONDARY TRANSFER DESTATICIZING BIAS ADJUSTMENT — NO ADJUSTMENT _725_
- SADDLE STITCHING FOLD POSITION ADJUSTMENT _721_ ◆ PRIMARY TRANSFER VOLTAGE ADJUSTMENT — NO ADJUSTMENT _726_

_715_ _716_ _703_

SHEET LIST _727_

| SHEET NAME | GRAMMAGE | SIZE | WIDTH | HEIGHT | SURFACE NATURE | FEATURES | COLOR |
|---|---|---|---|---|---|---|---|
| THICK SHEET | 300 | A4 | 2970 | 2100 | QUALITY SHEET | NORMAL | WHITE |
| BOTH-SIDES COATED SHEET | 105 | A4 | 2970 | 2100 | BOTH-SIDES COATED | NORMAL | WHITE |
| ONE-SIDE COATED SHEET | 105 | A4 | 2970 | 2100 | ONE-SIDE COATED | PUNCH SHEET | WHITE |
| OHP SHEET | 80 | A4 | 2970 | 2100 | OHP | FEATURES | TRANSPARENT |

_730_ _731_ _732_ _733_ _728_ _729_

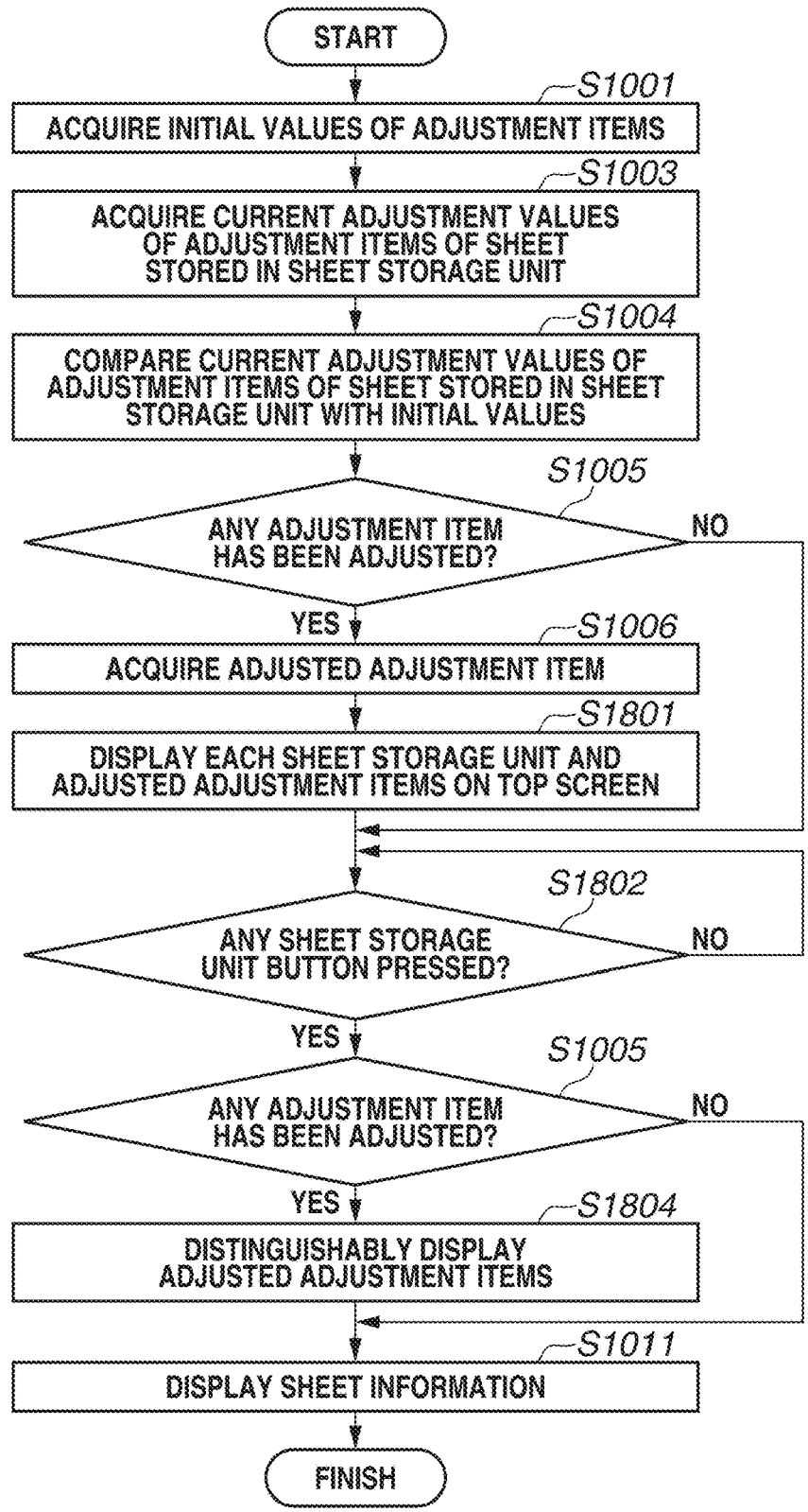

FIG.18A

DECK 1

[ASSIGNMENT] [UPDATE SHEET LIST] [CLOSE]

SHEET INFORMATION
- NAME: THICK SHEET
- GRAMMAGE: 300 g/m²
- SIZE: A4
- SURFACE NATURE: QUALITY SHEET
- FEATURES: NORMAL
- COLOR: WHITE
- SECOND SIDE OF BOTH-SIDES SHEET: NOT PRINTED
- GRAIN: INDEFINITE

- IMAGE POSITION ADJUSTMENT: ADJUSTMENT POSSIBLE
- CURL CORRECTION: NO ADJUSTMENT
- SADDLE STITCHING FOLD POSITION ADJUSTMENT: 0 mm
- CREEP CORRECTION AMOUNT ADJUSTMENT: 0 mm
- SADDLE STITCHING FOLD POSITION ADJUSTMENT: 0 mm
- SECONDARY TRANSFER VOLTAGE ADJUSTMENT: ADJUSTMENT POSSIBLE
- SADDLE STITCH POSITION CHANGE: 0 mm
- TIP PORTION SECONDARY TRANSFER VOLTAGE ADJUSTMENT: NO ADJUSTMENT
- SECONDARY TRANSFER DESTATICIZING BIAS ADJUSTMENT: NO ADJUSTMENT
- PRIMARY TRANSFER VOLTAGE ADJUSTMENT: NO ADJUSTMENT

SHEET LIST

| SHEET NAME | GRAMMAGE | SIZE | WIDTH | HEIGHT | SURFACE NATURE | FEATURES | COLOR |
|---|---|---|---|---|---|---|---|
| THICK SHEET | 300 | A4 | 2970 | 2100 | QUALITY SHEET | NORMAL | WHITE |
| BOTH-SIDES COATED SHEET | 105 | A4 | 2970 | 2100 | BOTH-SIDES COATED | NORMAL | WHITE |
| ONE-SIDE COATED SHEET | 105 | A4 | 2970 | 2100 | ONE-SIDE COATED | PUNCH SHEET | WHITE |
| OHP SHEET | 80 | A4 | 2970 | 2100 | OHP | FEATURES | TRANSPARENT |

FIG.18B

DECK 1

[ASSIGNMENT] [UPDATE SHEET LIST] [CLOSE]

SHEET INFORMATION
- NAME: THICK SHEET
- GRAMMAGE: 300 g/m²
- SIZE: A4
- SURFACE NATURE: QUALITY SHEET
- FEATURES: NORMAL
- COLOR: WHITE
- SECOND SIDE OF BOTH-SIDES SHEET: NOT PRINTED
- GRAIN: INDEFINITE

◆ IMAGE POSITION ADJUSTMENT [ADJUSTMENT POSSIBLE]
◆ SECONDARY TRANSFER VOLTAGE ADJUSTMENT [ADJUSTMENT POSSIBLE]

SHEET LIST

| SHEET NAME | GRAMMAGE | SIZE | WIDTH | HEIGHT | SURFACE NATURE | FEATURES | COLOR |
|---|---|---|---|---|---|---|---|
| THICK SHEET | 300 | A4 | 2970 | 2100 | QUALITY SHEET | NORMAL | WHITE |
| BOTH-SIDES COATED SHEET | 105 | A4 | 2970 | 2100 | BOTH-SIDES COATED | NORMAL | WHITE |
| ONE-SIDE COATED SHEET | 105 | A4 | 2970 | 2100 | ONE-SIDE COATED | PUNCH SHEET | WHITE |
| OHP SHEET | 80 | A4 | 2970 | 2100 | OHP | FEATURES | TRANSPARENT |

PRINT CONTROL APPARATUS, METHOD FOR CONTROLLING THE SAME, AND STORAGE MEDIUM

BACKGROUND OF THE INVENTION

Field of the Invention

The present disclosure relates to a print control apparatus, a method for controlling the print control apparatus, and a storage medium.

Description of the Related Art

A printing apparatus has a plurality of sheet storage units including a sheet deck for storing sheets, a manual feed tray, and a sheet cassette, and the like. The printing apparatus is capable of performing printing by using sheets having different sheet attributes, such as the sheet size, grammage, and types including coated sheet, quality sheet, etc. When performing printing, a plurality of adjustment items for adjusting the finishing state of a print product is set for a predetermined sheet.

In a known method, when a user clicks a button indicating a sheet storage unit on the operation unit of the printing apparatus, a sheet information display screen opens to display sheet information including settings of sheet attributes and adjustment items of the sheet stored in the sheet storage unit, such as a paper feed deck and a manual feed tray.

Japanese Patent Application Laid-Open No. 2009-12256 discusses a technique for displaying, in image position adjustment, whether image position adjustment is needed to be performed for each of a plurality of sheet feed stages displayed in one screen. When the user presses an adjustment page print key, an adjustment screen opens to display presence or absence of the current image position adjustment settings for a sheet stored in each of a plurality of sheet feed stages and displays specific adjustment values when the settings are present.

In some cases, a user may want to use previous adjustments of a plurality of adjustment items for a predetermined sheet or perform readjustment by using previous adjustments. In such a case, to easily recognize adjusted adjustment items of a plurality of adjustment items for a predetermined sheet, the user may want to acquire and display adjusted adjustment items of a plurality of adjustment items for the predetermined sheet.

Japanese Patent Application Laid-Open No. 2009-12256 discusses a technique for displaying the presence or absence of image position adjustment for each of a plurality of sheet storage units, as one of a plurality of adjustment items for sheets stored in sheet storage units. However, there has been no consideration on displaying the presence or absence of adjustment items, of which adjustment values have been set, from among a plurality of adjustment items for a predetermined sheet.

SUMMARY OF THE INVENTION

In view of the above-described issues, a print control apparatus of the present disclosure is directed to allowing a user to easily recognize adjustment items of which setting values set in association with identification information for each sheet have been adjusted.

According to an aspect of the present invention, a print control apparatus to communicate with a printing apparatus includes a storage unit configured to store identification information of a plurality of sheets and adjustment values of a plurality of adjustment items in such a manner that each identification information is associated with the adjustment values, a display unit configured to display the identification information of the plurality of sheets stored in the storage unit, a setting unit configured to set, based on a user instruction, the adjustment values of the adjustment items stored in the storage unit, and a first selection unit configured to select, based on a user instruction, identification information of one sheet from among the identification information of the plurality of sheets displayed on the display unit, wherein, based on a selection by the first selection unit, the display unit displays, in addition to the displayed identification information of the plurality of sheets, at least one of the adjustment items of which adjustment values set by the setting unit are stored from among the adjustment values associated with the selected identification information of the one sheet.

Further features of the present invention will become apparent from the following description of embodiments with reference to the attached drawings.

BRIEF DESCRIPTION OF THE DRAWINGS

FIGS. 6A and 6B illustrate screens of a sheet management application.

FIG. 9 is a diagram illustrating a screen of the sheet management application.

FIG. 10 is a diagram illustrating another screen of the sheet management application.

FIG. 11 is a diagram illustrating a setting screen for setting display of adjustment items.

FIG. 14 is a diagram illustrating a setting screen for setting the arrangement order of adjustment items.

FIGS. 16A and 16B are diagrams illustrating a screen of the sheet management application and a setting screen for setting adjustment items, respectively.

FIG. 17 is yet another flowchart illustrating processing for displaying sheet information of the sheet stored in a sheet storage unit.

FIGS. 18A and 18B are diagrams illustrating setting screens for setting adjustment items.

DESCRIPTION OF THE EMBODIMENTS

Figure 1:
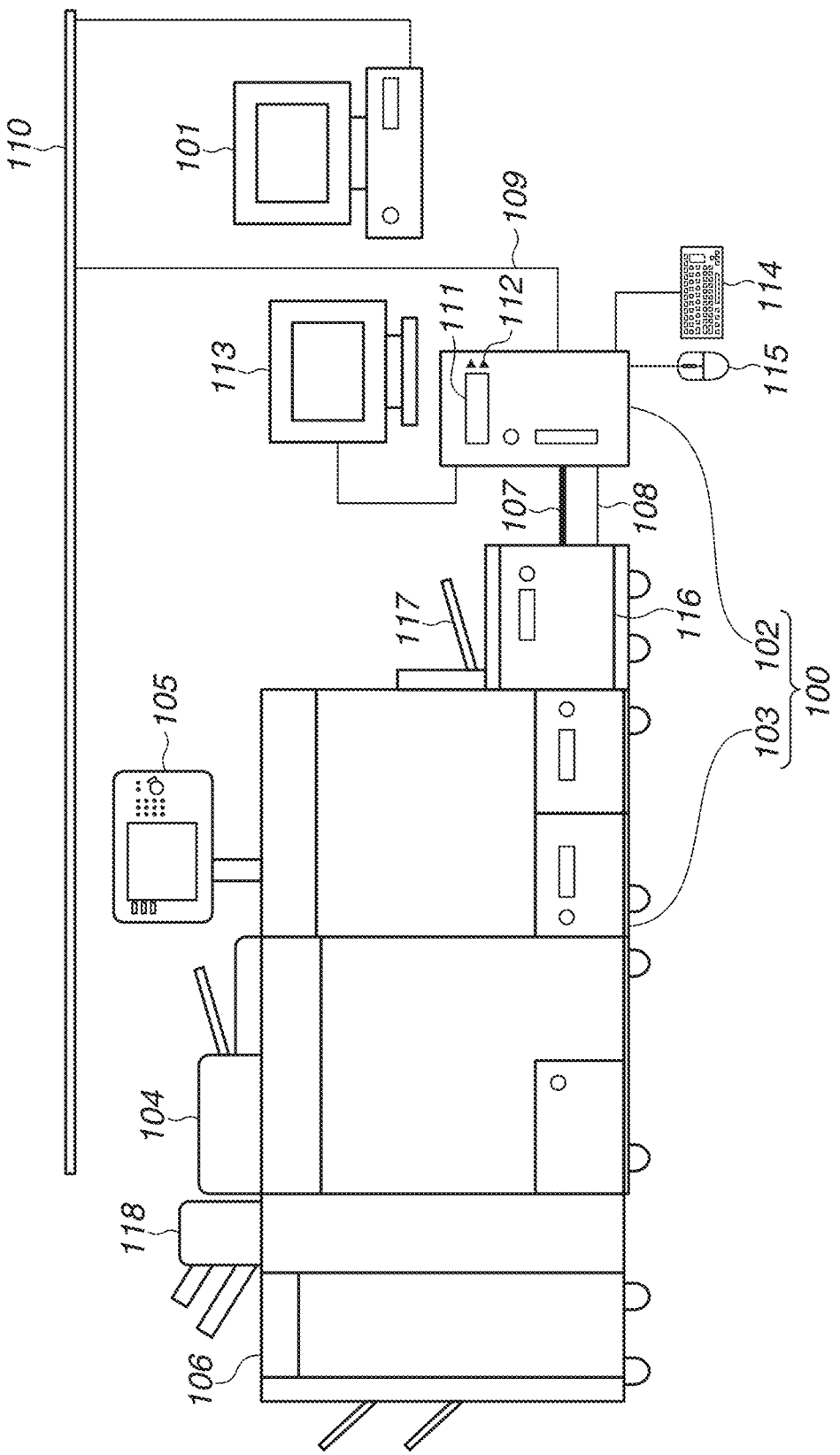
FIG. 1 is a block diagram illustrating a configuration of an image forming system.

FIG. 1 is a block diagram illustrating a configuration of an image forming system 100 according to a first embodiment. The image forming system 100 illustrated in FIG. 1 includes a printing apparatus 103 and a print control apparatus 102.

The image forming system 100 is connected with a client computer 101 to communicate with each other. The client computer 101 and the print control apparatus 102 are connected to and communicate with each other via a local area network (LAN) 110 by using an Ethernet (registered trademark) cable 109. The print control apparatus 102 and the printing apparatus 103 are connected with each other via an image video cable 107 and a control cable 108.

According to the present embodiment, the printing apparatus 103 is not directly connected to the LAN 110. The printing apparatus 103 and the client computer 101 communicate with each other via the print control apparatus 102. The printing apparatus 103 can also be directly connected to the LAN 110.

The client computer 101 activates an application to issue a printing instruction to the image forming system 100.

The print control apparatus 102 performs image processing together with the printing apparatus 103. The printing apparatus 103 is a multifunction peripheral having various functions. The printing apparatus 103 can perform not only image processing on an image from the client computer 101 and the print control apparatus 102 but also copying data read from a scanner 104 and transmitting data to a shared folder.

When the scanner 104 scans an image, the printing apparatus 103 receive various instructions from the user via various keys on an operation unit 105. The operation unit 105 displays various information, such as a scanning state, via a panel. A post-processing apparatus 106 receives a sheet with an image formed thereon, performs post-processing on the sheet, and then discharges the sheet.

The image forming system 100 also includes a long deck 116 as a sheet deck capable of storing a long sheet, a manual feed tray 117, and an inserter 118. A display unit 111 displays information about the print control apparatus 102. An operation button unit 112 includes hardware operation buttons of the print control apparatus 102. The operation button unit 112 is used for an operation on the information displayed on the display unit 111. The information displayed on the display unit 111 is used to display minimum information (for confirming the power operation and IP address) necessary to operate the print control apparatus 102.

A display apparatus 113 included in the print control apparatus 102 is a liquid crystal display (LCD) monitor. A keyboard 114 and a pointing device 115 are used to operate the print control apparatus 102. Although, in the present embodiment, the print control apparatus 102 and the printing apparatus 103 are provided as separate apparatuses, processing performed by the print control apparatus 102 can be incorporated into the printing apparatus 103, and the print control apparatus 102 can be physically omitted. The display apparatus 113 can include a position input function like a touchpad and can have the function of the pointing device 115.

Figure 2:
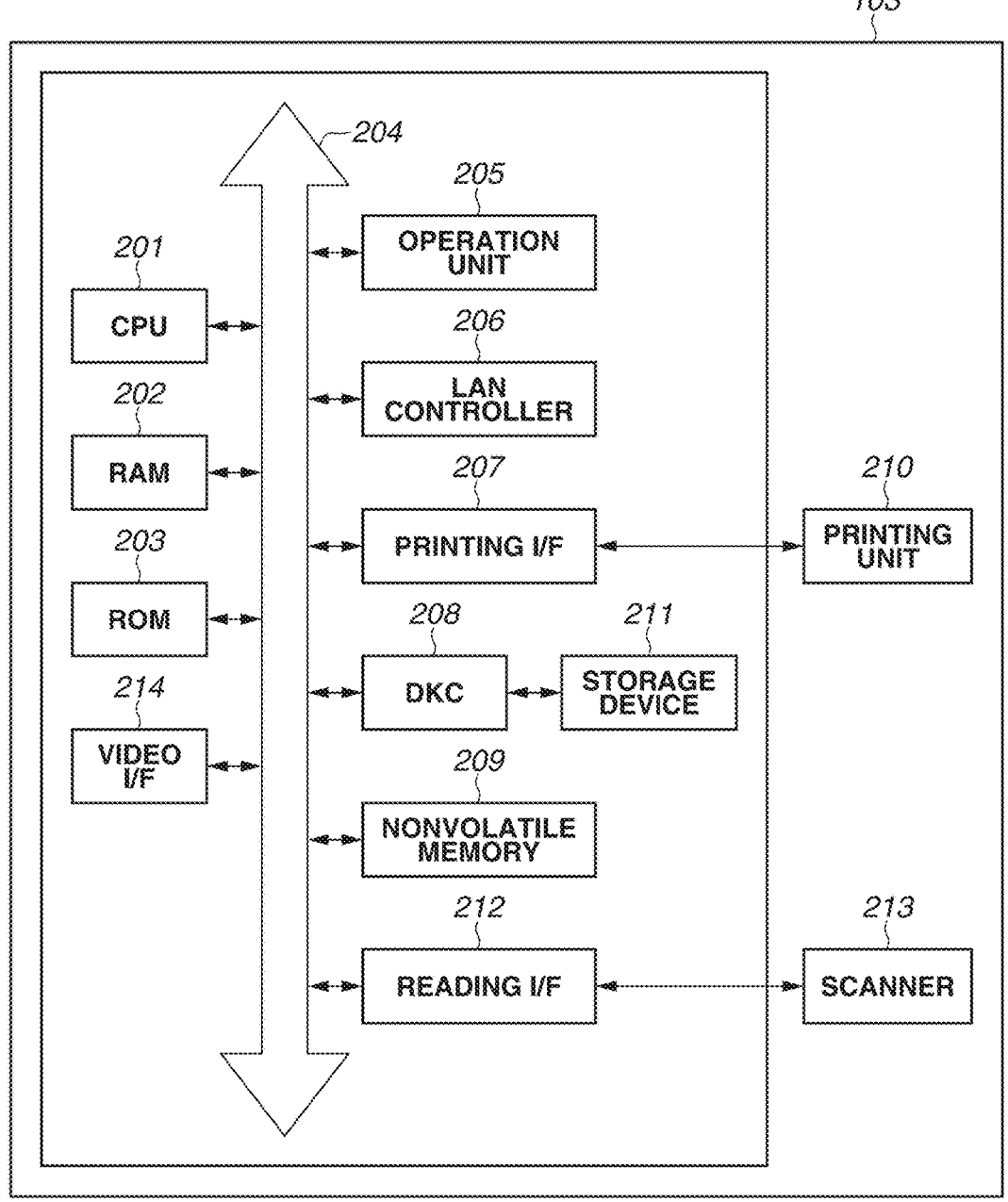
FIG. 2 is a block diagram illustrating a hardware configuration of a printing apparatus.

FIG. 2 is a block diagram illustrating a hardware configuration of the printing apparatus 103.

A central processing unit (CPU) 201 controls the operation of the entire printing apparatus 103.

A LAN controller 206 is connected to the LAN 110. The CPU 201 can communicate with the print control apparatus 102 via the LAN controller 206.

A random access memory (RAM) 202 functions as the main memory of the CPU 201, a work area and the like.

A storage device 211 includes a hard disk (HDD), a solid-state drive (SSD), an integrated circuit (IC) card, and the like. The storage device 211 stores, for example, application programs, font data, form data and temporarily spools print jobs. The storage device 211 is also used as a job storage area for controlling spooled jobs from outside. A program stored in the storage device 211 is loaded into the RAM 202 and then executed by the CPU 201.

The storage device 211 is also used as a BOX data storage area, more specifically, the storage device 211 stores image data read from a scanner 213 and image data of a print job as BOX data. The image data in the storage device 211 is referenced and printed via a network. According to the present embodiment, a HDD is used as the storage device 211 to store job logs, image logs, and other various logs.

A disk controller (DKC) 208 controls access to the storage device 211. A read only memory (ROM) 203 functions as a boot ROM which stores the boot program of the printing apparatus 103.

An operation unit 205 includes software keys or hardware keys which are operated by the user to input various information.

A nonvolatile memory 209 stores various setting information set from a terminal via the operation unit 205 or a network. A video interface (I/F) 214 receives image data from the print control apparatus 102.

A LAN controller 206 is connected to the LAN 110 to input and output image data and other information via the LAN 110.

A printing I/F 207 is connected to a printing unit (hereinafter referred to as a printer engine) 210 and the CPU 201. The CPU 201 outputs image signals as output information to the printer printing unit 210 via the printing I/F 207.

A reading I/F 212 is connected with the scanner 213 and the CPU 201. The CPU 201 controls image signals input from the scanner 213 via the reading I/F 212.

The CPU 201, the RAM 202, the ROM 203, the video I/F 214, the operation unit 205, the LAN controller 206, the printing I/F 207, the DKC 208, the nonvolatile memory 209, and the reading I/F 212 are connected to a system bus 204. The CPU 201 controls access to various devices via the system bus 204.

Figure 3:
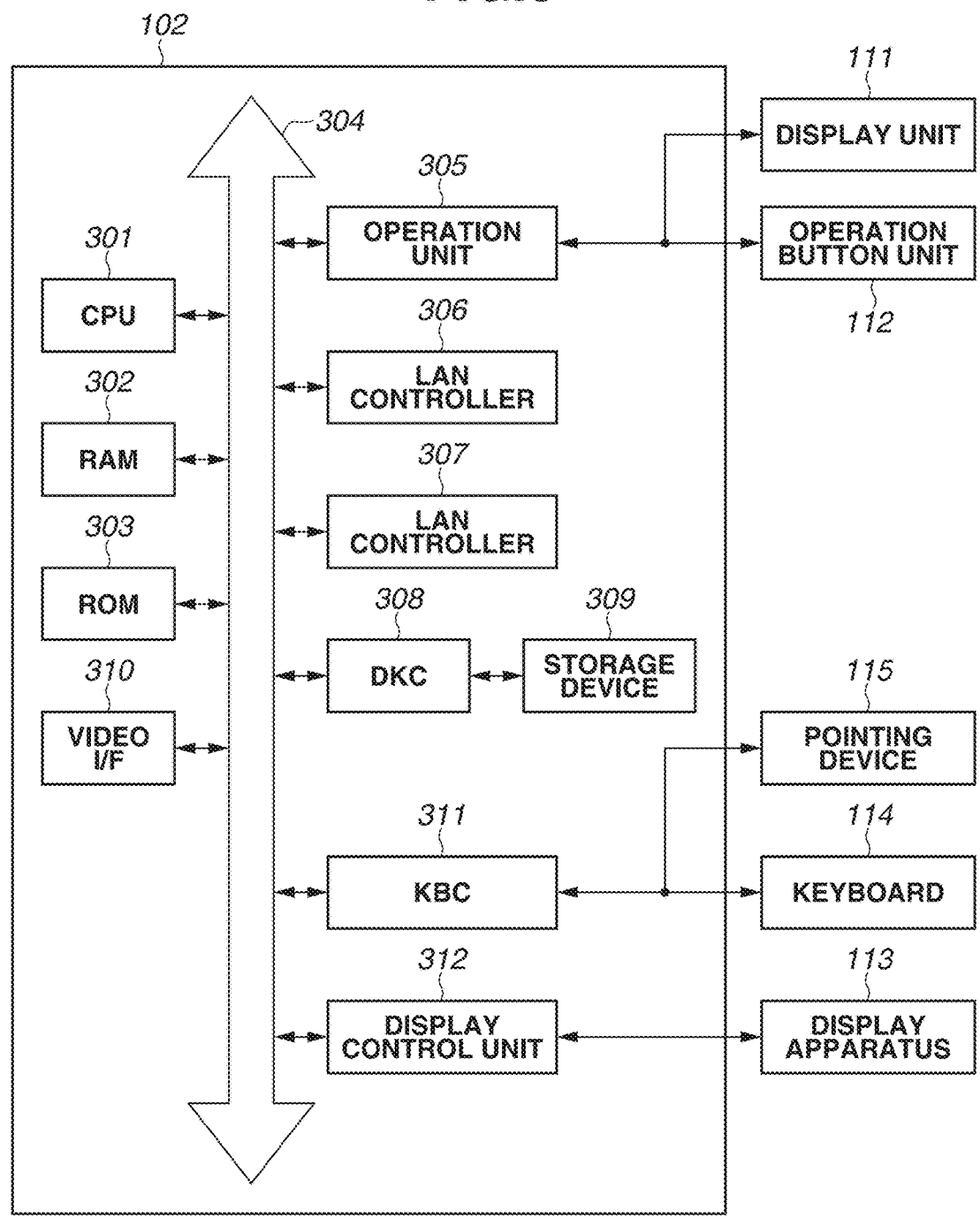
FIG. 3 is a block diagram illustrating a hardware configuration of a print control apparatus.

FIG. 3 is a block diagram illustrating a hardware configuration of the print control apparatus 102.

A CPU 301 controls the operation of the entire print control apparatus 102. For example, the CPU 301 performs use control for controlling whether a sheet storage unit is enabled or disabled.

A LAN controller 306 is connected to the LAN 110. The CPU 201 can communicate with the printing apparatus 103 via the LAN controller 306.

A LAN controller 307 is connected to the LAN 110. The CPU 201 can communicate with a client computer 101 on the network and with the printing apparatus 103 via the LAN controller 307.

A RAM 302 functions as the main memory of the CPU 301, a work area, and the like.

A storage device 309 includes a hard disk (HDD), a solid-state drive (SSD), and an integrated circuit (IC) card. The storage device 309 stores application programs, font data, form data, and the like and temporarily spools print jobs. The storage device 211 is also used as a job storage area for controlling spooled jobs from outside. A program stored in the storage device 309 is loaded into the RAM 302 and then executed by the CPU 301.

Spooled jobs are subjected to Raster Image Processor (RIP) processing. The storage device 309 is used as a job storage area for storing RIP-processed image data.

A disk controller (DKC) 308 controls access to the storage device 309. A ROM 303 functions as a boot ROM which stores the boot program of the printing apparatus 103.

An operation unit 305 includes the operation button unit 112 and the display unit 111. The operation button unit 112 is operated by the user to input various information. Input information is displayed on the display unit 111.

A video I/F 310 outputs RIP-processed image data to the printing apparatus 103. A keyboard controller (hereinafter referred to as a KBC) 311 performs processing related to information input from the pointing devices 115, such as the keyboard 114 and a mouse (registered trademark).

A display control unit 312 includes a memory (hereinafter referred to as a video memory). The display control unit 312 stores image data in the video memory according to an instruction received from the CPU 301 and outputs stored image data as video signals to the display apparatus 113.

The CPU 301, the RAM 302, the ROM 303, the video I/F 310, the operation unit 305, the LAN controller 306, the LAN controller 307, the DKC 308, the storage device 309, the KBC 311, and the display control unit 312 are connected to a system bus 304. The CPU 301 controls access to various devices via the system bus 304.

Figure 4:
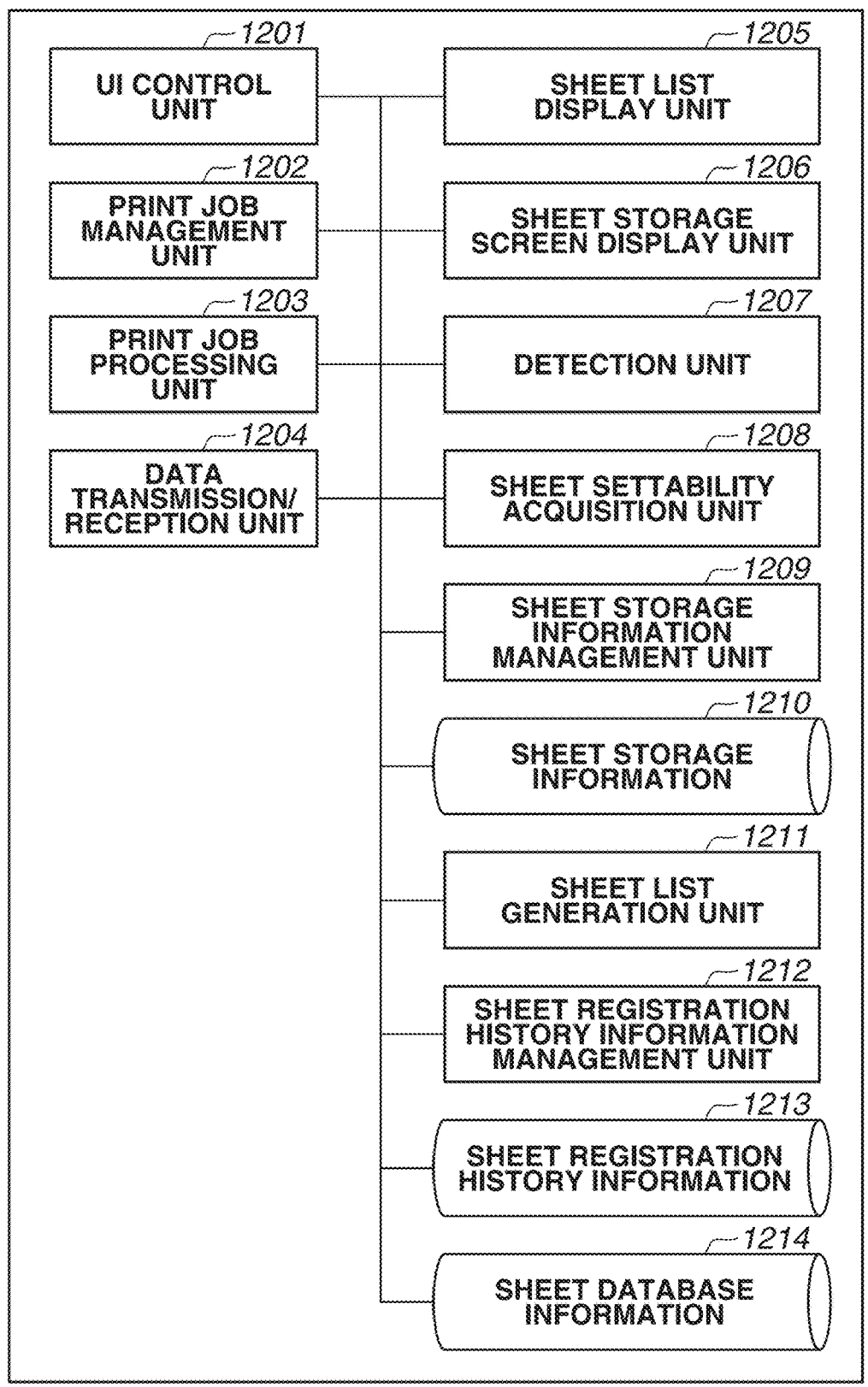
FIG. 4 is a block diagram illustrating a software configuration of the print control apparatus.

FIG. 4 is a block diagram illustrating a software configuration of the print control apparatus 102. These software modules are stored as programs in the storage device 309 and are loaded into the RAM 302 and then executed by the CPU 301.

A user interface (UI) control unit 1201 performs display control of the display unit 111 and the display apparatus 113 via the operation unit 305 and the display control unit 312, respectively. The UI control unit 1201 also controls input of various setting information set through the operation button unit 112, the keyboard 114, and the pointing device 115.

A print job management unit 1202 manages print job data received from the user. More specifically, the print job management unit 1202 performs processing for calling print job data stored in the storage device 309, reflecting setting changes on print jobs by the user, and managing the history of printed jobs. A print job processing unit 1203 performs processing for print processing execution, for example, processing for analyzing a print job received from the user, processing for generating image data, and processing for compressing and decompressing an image.

A data transmission/reception unit 1204 manages various data transmission and reception to/from the printing apparatus 103. The data transmission/reception unit 1204 transmits print job data generated by the print job processing unit 1203 to the printing apparatus 103. The data transmission/reception unit 1204 also manages data transmission and reception to/from the client computer 101 connected via an external network.

A sheet list display unit 1205 displays pieces of sheet information as a sheet list on the top screen of a sheet management application displayed on the display apparatus 113. The sheet management application is an application for managing sheet features including sheet type, size, grammage, and the like of sheets usable by the printing apparatus 103 and setting adjustment items for each sheet type. The finishing state of a print product is adjusted by the set values of the adjustment items. The values of the adjustment items are recorded as a piece of the sheet information in the storage device 309 (HDD).

The sheet list display unit 1205 changes display of the display apparatus 113 each time a sheet list as a display target is updated. According to the present embodiment, by using the sheet management application, the user can set which sheet storage unit stores a sheet having which piece of the sheet information.

A sheet list generation unit 1211 generates a sheet list to be displayed by the sheet list display unit 1205. The sheet list generation unit 1211 generates a sheet list for displaying pieces of the sheet information in descending order of the number of times that each piece of the sheet information has been registered in the sheet storage units by the user. Processing for generating a sheet list will be described in detail below.

Sheet registration history information 1213 indicates how many times each piece of the sheet information stored in the sheet database is registered to which sheet storage unit. This information is used by the sheet list generation unit 1211 to generate a sheet list.

The sheet registration history information management unit 1212 manages the sheet registration history information 1213. For example, when the user selects a piece of sheet information from the sheet list and registers the sheet information to a sheet storage unit, the sheet registration history information management unit 1212 updates the sheet registration history information 1213. Sheet database information 1214 stores pieces of the sheet information, including sheet type, size, and grammage, of sheets usable by the printing apparatus 103. This database is stored in the storage device 309.

In addition to pieces of the sheet information preregistered as product specifications of the printing apparatus 103, the sheet database information 1214 stores a piece of the sheet information which is generated by the user by performing a predetermined operation through the sheet management application. The sheet information is information having correspondences between identification information of a sheet and attribute information of the sheet. An example of the identification information of a sheet is the name of the sheet. The attribute information of a sheet includes the sheet size, type, color, and the like of the sheet. The sheet database information 1214 also stores the identification information of a sheet in association with adjustment values of the adjustment items. Examples of the adjustment items include setting items including setting values that are used when the printing apparatus 103 performs image printing on the sheet, such as adjustment values of image print positions and voltage values of transfer voltages. The printing apparatus 103 also stores the same information. When the database of either one of the printing apparatus 103 or the print control apparatus 102 is updated, the database of the other is also updated via the data transmission/reception unit 1204.

A sheet storage screen display unit 1206 controls display of sheet storage unit buttons 406 to 411 illustrated in FIG. 6A. When the user selects a piece of the sheet information from the sheet list and registers the sheet information to a sheet storage unit, the sheet storage screen display unit 1206 displays the sheet information registered to the sheet storage unit button.

A detection unit 1207 detects a click operation performed on a top screen 401 of the sheet management application using the operation unit 305, such as the pointing device 115 illustrated in FIGS. 6A and 6B. The detection unit 1207 detects a click operation on the pointing device 115 and at the same time acquires information about the clicked position.

A sheet settability acquisition unit 1208 makes an inquiry about whether the sheet corresponding to the sheet information selected by the user is settable in each sheet storage unit of the printing apparatus 103. The sheet settability acquisition unit 1208 receives an inquiry result from the printing apparatus 103.

Sheet storage information 1210 stores pieces of the sheet information registered to the sheet storage units included in the printing apparatus 103. The sheet storage information 1210 stores each sheet storage unit and a piece of the sheet information of a sheet stored in each sheet storage unit in an associated way. For example, when the top screen 401 illustrated in FIG. 6A is displayed on the display apparatus 113, the sheet storage information 1210 stores that the sheet information indicating one-side coated sheet, A4, 300 grams per square meter (gsm), and white color shown in the sheet storage unit button 406 of a sheet storage deck 1 is registered.

A sheet storage information management unit 1209 updates the sheet storage information 1210 in response to a user operation made on the keyboard 114 and the pointing device 115. When the sheet storage information 1210 is updated, the sheet storage information 1306 (FIG. 5) stored in the printing apparatus 103 is synchronized with the sheet storage information 1210 via the data transmission/reception unit 1204.

Figure 5:
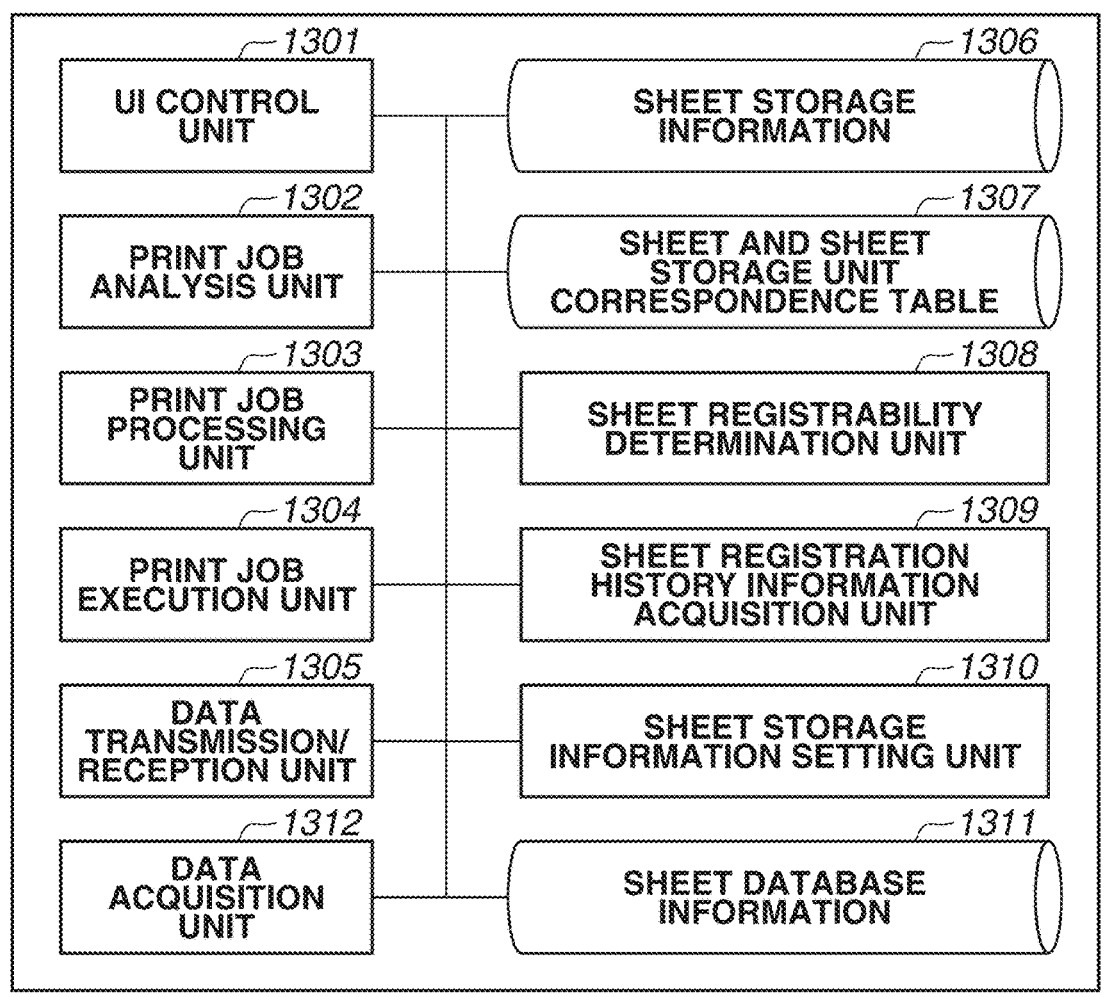
FIG. 5 is a block diagram illustrating a software configuration of the printing apparatus.

FIG. 5 is a block diagram illustrating a software configuration of the printing apparatus 103. These software modules are stored in the storage device 211 as programs and are loaded into the RAM 202 and then executed by the CPU 201.

A UI control unit 1301 controls display on the operation unit 205 and input from the operation unit 205. A print job analysis unit 1302 analyzes data of a print job received from the print control apparatus 102. A print job processing unit 1303 performs print processing on the print job needed for the printing apparatus 103.

A print job execution unit 1304 controls a series of printing operations for the print job, including sheet storage, sheet conveyance, printing, and discharge. Based on information of the sheet to be used, which is analyzed by the print job analysis unit 1302, and the sheet storage information 1306 (described below), the print job execution unit 1304 identifies the sheet storage unit storing the sheet to be used and feeds the sheet from the sheet storage unit. A data transmission/reception unit 1305 controls data transmission and reception to/from the print control apparatus 102.

The sheet storage information 1306 is information on a relation between each sheet storage unit included in the printing apparatus 103 and pieces of the sheet information registered to the sheet storage unit. The sheet storage information 1306 is updated when it is synchronized with the sheet storage information 1210 through the sheet management application.

A sheet and sheet storage unit correspondence table 1307 indicates the relation between each sheet storage unit and the sheet settable in the sheet storage unit.

When receiving an inquiry from the print control apparatus 102, a sheet registrability determination unit 1308 determines whether the sheet in the inquiry is settable in each sheet storage unit, with reference to the sheet and sheet storage unit correspondence table 1307.

A sheet storage information setting unit 1310 performs processing for storing the sheet information registered to each sheet storage unit and acquiring the sheet information registered to each sheet storage unit.

When the sheet storage information 1306 is updated in the printing apparatus 103, the sheet registration history information acquisition unit 1309 acquires the information and transmits the information to the print control apparatus 102 via the data transmission/reception unit 1305.

Sheet database information 1311 is the same as the sheet database information 1214 in the print control apparatus 102, and a redundant description thereof will be omitted. This database is stored in the storage device 211.

A data acquisition unit 1312 acquires model information and hardware option information of the printing apparatus 103 from the ROM 203 and the storage device 211 of the printing apparatus 103. In response to a request from the print control apparatus 102, the data acquisition unit 1312 transmits the acquired information to the print control apparatus 102 via the data transmission/reception unit 1305.

As shown in FIGS. 4 and 5, both the print control apparatus 102 and the printing apparatus 103 store the sheet storage information 1210 and the sheet database information 1214 and the sheet storage information 1306 and the sheet database information 1311, respectively. However, each piece of the sheet storage information and the sheet database information may be stored in either the print control apparatus 102 or the printing apparatus 103.

A screen of the sheet management application will be described below with reference to FIGS. 6A and 6B. FIGS. 6A and 6B illustrate the top screen displayed on the display apparatus 113 when the sheet management application is activated. The sheet management application operates when being activated on the print control apparatus 102 by the user.

FIG. 6A is a diagram illustrating a screen displaying the sheet information of the sheet stored in each sheet storage unit of the printing apparatus 103. FIG. 6B is a diagram illustrating a screen displaying buttons which allow various adjustment items of the printing apparatus 103 to be set. The top screen of the sheet management application is displayed when image data is drawn in the video memory according to an instruction from the CPU 301, and the image data drawn in the video memory is output to the display apparatus 113 as video signals.

The top screen 401 is the top screen of the sheet management application. A screen 402 allows the user to change the contents of display by using a device tab 403 and an adjustment tab 404. When the user presses the device tab 403, the screen 402 illustrated in FIG. 6A appears to display the sheet information of the sheet set in each sheet storage unit of the printing apparatus 103.

When the sheet management application is activated, the print control apparatus 102 acquires the hardware option information of the printing apparatus 103 and displays correct images according to the hardware option information.

Referring to FIG. 6A, a plurality of sheet storage decks (internal sheet storage decks), a long deck (external sheet storage deck), a plurality of inserters, and a manual feed tray are attached as a plurality of sheet storage units. In addition, a finisher is attached.

Sheet storage unit buttons 406 and 407 correspond to sheet storage decks 1 and 2, respectively. A sheet storage unit button 408 corresponds to the long deck. A sheet storage unit button 409 corresponds to a manual feed tray. Sheet storage unit buttons 410 and 411 correspond to inserters 1 and 2, respectively.

The sheet storage unit buttons 406 to 411 display the sheet information of the sheets set in the sheet storage units and are selectively displayed on the top screen 401. The sheet management application generates and arranges the sheet storage unit buttons 406 to 411 based on the information of the sheet storage units of the printing apparatus 103 acquired when the sheet management application is activated.

An assignment button 412 is arranged in each of the sheet storage unit buttons 406 to 411. The assignment button 412 has two different states (assignment buttons 412A and 412B) with different colors. The assignment button 412A indicates the enabled state, and the assignment button 412B indicates the disabled state.

The states of the assignment button 412 can be switched between the enabled state (state of the assignment button 412A) and the disabled state (state of the assignment button 412B) by the user pressing these buttons.

A sheet list display area 414 is an area for displaying a sheet list based on the pieces of the sheet information stored in the sheet database information 1214.

Each column displays the sheet information including a sheet size, grammage, etc. and each row displays the sheet type. To display pieces of sheet information other than the currently displayed sheet information of the sheet types, the user operates a slider bar 416.

To display sheet types other than the currently displayed sheet types, the user operates a slider bar 415. When the device tab 403 is selected, the user can simultaneously confirm both the sheet information of the sheet set to each sheet storage unit and a list of the sheet information stored in the sheet database information 1214.

FIG. 6B illustrates a screen for setting each adjustment item for the sheet information displayed in the sheet list display area 414. An adjustment item list 417 is an area where buttons for setting various adjustment items are arranged. The adjustment item list 417 displays adjustment items adjustable by the printing apparatus 103. By operating a slider bar 418, the user can check adjustment item settings which are not currently displayed.

The user registers the sheet information of the sheets stored in the sheet storage units by using the top screen of the sheet management application. The user selects the device tab 403. The user positions a cursor of the pointing device 115 at the sheet information of the sheet to be selected and then presses the button of the pointing device 115. The sheet information currently displayed in the sheet list or the sheet information currently registered to the sheet storage unit buttons 406 to 411 are selectable sheet information.

The user positions the cursor at the sheet information to be selected, presses and holds the button of the pointing device 115, and then moves the cursor to the position of the sheet storage unit button in which the sheet of the sheet information is to be set. After moving the cursor to the position of the sheet storage unit button as the registration target, the user releases the button of the pointing device 115.

When the user performs this operation, the selected sheet information is registered to the sheet storage unit pointed by the cursor when the user releases the button of the pointing device 115. After registering the sheet information to the sheet storage unit, the user stores the sheet corresponding to the sheet information in the sheet storage unit.

To make it easier to recognize the disabled state of a sheet storage unit, display of the sheet storage unit button on the sheet management application can be changed. For example, display of the sheet storage unit can be changed by display-ing the sheet name in gray, or the sheet storage unit button can be displayed in light pink.

There are two different states where a sheet storage unit is disabled: a state where the sheet storage unit is disabled because the assignment button 412 is pressed and a state where the sheet storage unit is disabled because the sheet storage unit button is selected and then sheet setting is made. These two states can be displayed in different ways.

Figure 7:
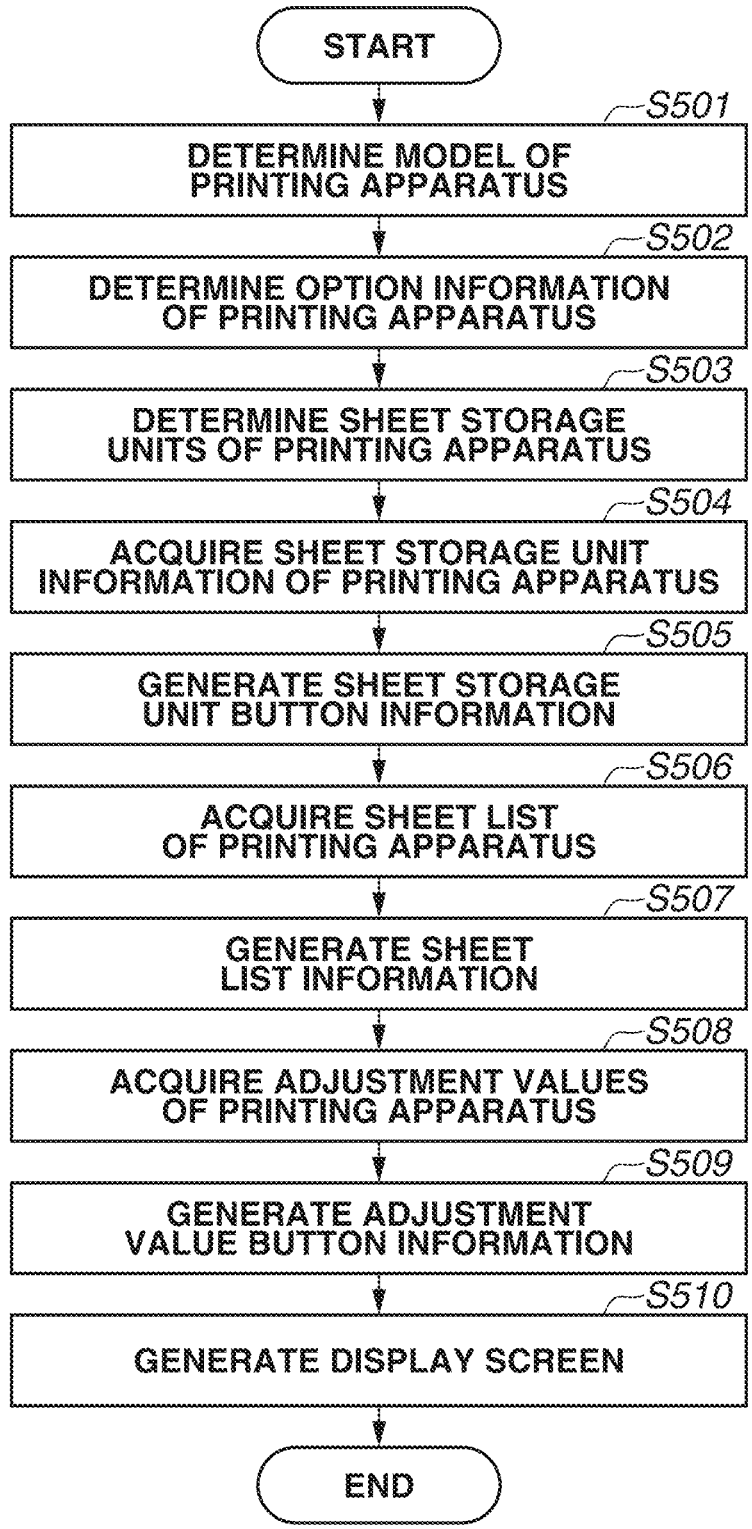
FIG. 7 is a flowchart illustrating processing when the sheet management application is activated.

FIG. 7 illustrates processing performed by the print control apparatus 102 when the sheet management application is activated. The program for performing processing in the flowchart illustrated in FIG. 7 is stored in the storage device 309 illustrated in FIG. 3. The program is loaded into the RAM 302 and then executed by the CPU 301.

When the sheet management application is activated, then in step S501, the CPU 301 determines the model of the printing apparatus 103 subjected to the sheet management. More specifically, the print control apparatus 102 communicates with the printing apparatus 103 to acquire model information and determines the model of the printing apparatus 103 based on model identification information prestored in the print control apparatus 102.

In step 502 (following step S501), the CPU 301 determines the hardware option information of hardware options connected with the printing apparatus 103. More specifically, the print control apparatus 102 communicates with the printing apparatus 103 to acquire the hardware option information and determines the hardware option information based on the hardware option information prestored in the print control apparatus 102.

In step S503 (following step S502), the CPU 301 determines the sheet storage units connected to the printing apparatus 103 subjected to the sheet management and identifies the number of sheet storage units connected.

In step S504 (following step S503), the print control apparatus 102 communicates with the printing apparatus 103 to acquire the sheet information set in each sheet storage unit.

In step S505 (following step S504), the CPU 301 generates information about the sheet storage unit buttons 406 to 411 to be displayed in the screen 402.

In step S506 (following step S505), the CPU 301 communicates with the printing apparatus 103 to acquire sheet list information. The sheet list information is stored in the storage device 211 of the printing apparatus 103. The sheet list stored in the printing apparatus 103 is synchronized with the sheet list stored in the print control apparatus 102.

In step S507 (following step S506), the CPU 301 generates a sheet list to be displayed in the sheet list display area 414. In addition to the above-described method, the CPU 301 can perform processing for generating a sheet list to be displayed on the display apparatus 113 of the print control apparatus 102. For example, in step S505, the data transmission/reception unit 1204 synchronizes the sheet database information 1311 and 1214 stored in the printing apparatus 103 and the print control apparatus 102, respectively. In step S506, the sheet list generation unit 1211 can generate a sheet list based on the sheet database information 1214 after the synchronization.

In step S508 (following step S507), the print control apparatus 102 communicates with the printing apparatus 103 to acquire the adjustment values of various adjustment items by using the adjustment buttons included in the adjustment item list 417. The adjustment value of each adjustment item not changed by the user is referred to as an initial value (initial setting value). In this case, the print control apparatus 102 acquires the adjustment values (setting values) of the adjustment items changed from the initial values. However, the print control apparatus 102 can acquire both the initial values and the setting values. If an adjustment value becomes the same value as the initial value as a result of adjustment, the adjustment value is regarded as a setting value.

In step S509 (following step S508), the UI control unit 1201 generates character strings which are displayed in the adjustment buttons included in the adjustment item list 417, based on the acquired adjustment values. For example, the UI control unit 1201 displays numerical values as adjustment values and displays whether adjustment is possible.

The UI control unit 1201 generates the top screen 401 by using the information acquired in steps S501 to S509. More specifically, the top screen 401 includes the model information and the hardware option information of the printing apparatus 103 acquired in steps S501 and S502. The top screen 401 further includes the sheet storage unit button information generated in step S505, the sheet list information generated in step S507, and the adjustment button information generated in step S509. In step S510, the generated top screen 401 is displayed on the display apparatus 113. Thus, the screens illustrated in FIGS. 6A and 6B are generated.

The adjustment item list 417 illustrated in FIG. 6B is displayed in list form. The adjustment item list 417 can display the adjustment items for which the adjustment values changed from the initial values have been acquired, at the upper portion of the list.

Figure 8:
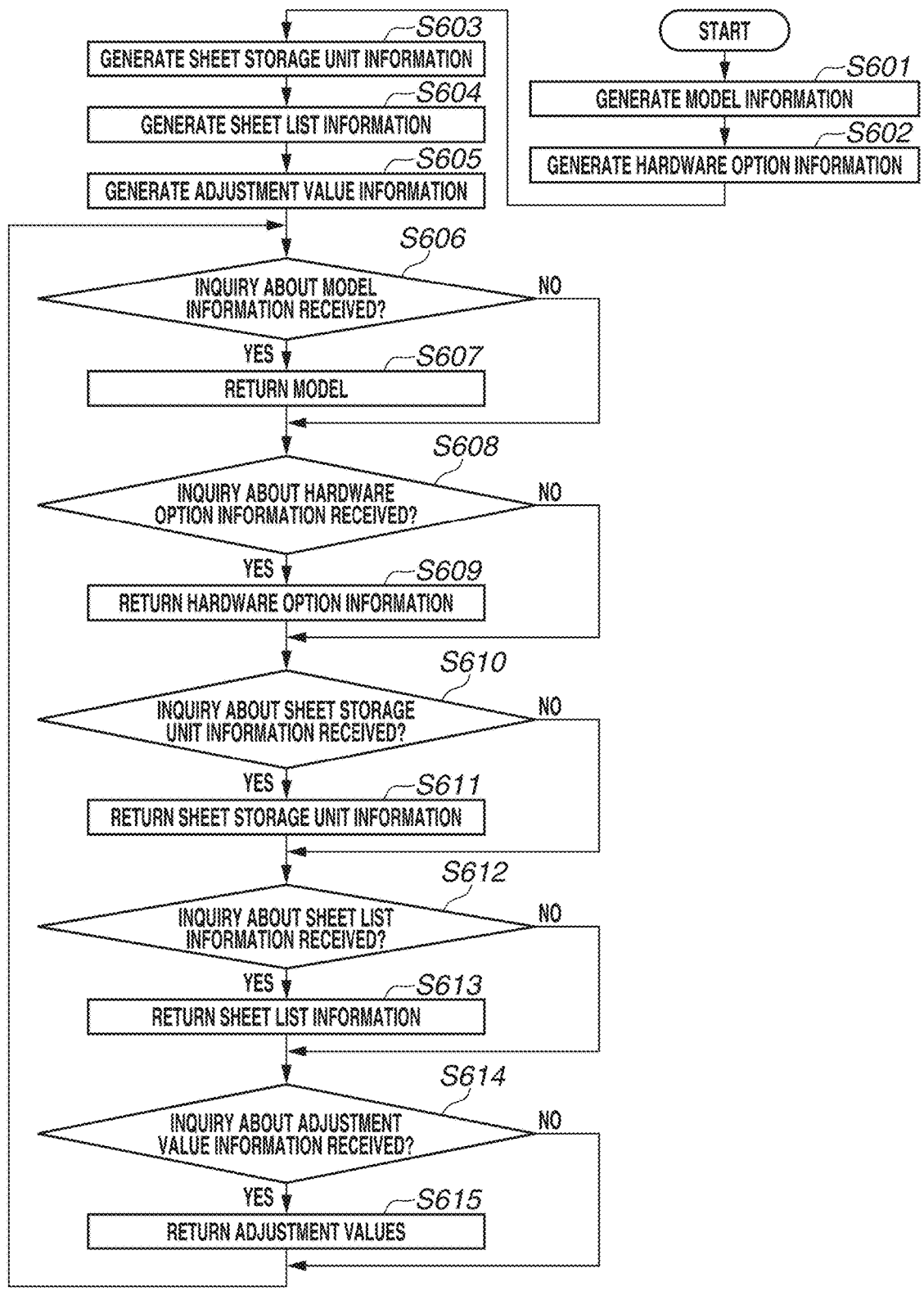
FIG. 8 is a flowchart illustrating processing when the printing apparatus is activated.

The operation performed the printing apparatus 103 when the print control apparatus 102 is activated will be described below with reference to the flowchart illustrated in FIG. 8. The program for performing the processing of the flowchart illustrated in FIG. 8 is stored in the storage device 211 illustrated in FIG. 2. The program is loaded into the RAM 202 and then executed by the CPU 201. When the printing apparatus 103 is activated, the printing apparatus 103 performs the following processing.

In step S601, the printing apparatus 103 acquires its own model information from the storage device 211 and generates returnable data.

In step S602 (following step S601), the printing apparatus 103 acquires the hardware option information of hardware options connected with the printing apparatus 103 from the storage device 211 and generates returnable data.

In step S603 (following step S602), the printing apparatus 103 generates data of sheet storage unit information based on its own sheet storage unit information and the hardware option information acquired in step S602.

In step S604 (following step S603), the printing apparatus 103 acquires its own sheet list information from the storage device 211 and generates returnable data.

In step S605 (following step S604), the printing apparatus 103 acquires its own adjustment values from the storage device 211 and generates returnable data. At this timing, the printing apparatus 103 acquires the adjustment values for all of the adjustment items that can be implemented as adjustment values by the printing apparatus 103. In this case, the printing apparatus 103 acquires the adjustment values (setting values) of the adjustment items changed from the initial values. However, the printing apparatus 103 can acquire both the initial values and the setting values. If a setting value becomes the same value as the initial value as a result of readjustment, the setting value is regarded as a changed adjustment value.

In step S606 (following step S605), the printing apparatus 103 determines whether an inquiry about the model information is received from the print control apparatus 102. In a case where an inquiry about the model information is received (YES in step S606), the processing proceeds to step S607. On the other hand, in a case where an inquiry about the model information is not received (NO in step S606), the processing proceeds to step S608.

In step S607, when an inquiry about the model information is received, the printing apparatus 103 transmits the model information generated in step S601 to the print control apparatus 102.

In step S608 (following step S607 or when an inquiry about the model information is not received in step S606), the printing apparatus 103 determines whether an inquiry about the hardware option information is received from the print control apparatus 102.

In a case where an inquiry about the hardware option information is received (YES in step S608), the processing proceeds to step S609. On the other hand, in a case where an inquiry about the hardware option information is not received (NO in step S608), the processing proceeds to step S610.

In step S609, when an inquiry about the hardware option information is received, the data transmission/reception unit 1305 transmits the hardware option information generated in step S602 to the print control apparatus 102.

In step S610 (following step S609 or when an inquiry about the hardware option information is not received in step S608), the printing apparatus 103 determines whether an inquiry about the sheet storage unit information is received from the print control apparatus 102.

In a case where an inquiry about the sheet storage information is received (YES in step S610), the processing proceeds to step S611. On the other hand, in a case where an inquiry about the sheet storage information is not received (NO in step S610), the processing proceeds to step S612. In step S611, when an inquiry about the sheet storage information is received, the printing apparatus 103 transmits the sheet storage unit information generated in step S603 to the print control apparatus 102. Then, the processing proceeds to step S612.

In step S612 (following step S611 or when an inquiry about the sheet information is not received), the printing apparatus 103 determines whether an inquiry about the sheet list information is received from the print control apparatus 102.

In a case where an inquiry about the sheet list information is received (YES in step S612), the processing proceeds to step S613. On the other hand, in a case where an inquiry about the sheet list information is not received (NO in step S612), the processing proceeds to step S614.

In step S613, when an inquiry about the sheet list information is received, the printing apparatus 103 transmits the sheet list information generated in step S604 to the print control apparatus 102. Then, the processing proceeds to step S614.

In step S614 (following step S613 or when an inquiry about the sheet list information is not received in step S612), the printing apparatus 103 determines whether an inquiry about the adjustment value information is received from the print control apparatus 102.

In a case where an inquiry about the adjustment value information is received (YES in step S614), the processing proceeds to step S615. On the other hand, in a case where an inquiry about the adjustment value information is not received (NO in step S614), the processing returns to step S606.

In step S615, when an inquiry about the adjustment value information is received, the printing apparatus 103 transmits the sheet storage unit information generated in step S605 to the print control apparatus 102.

Following step S615 or when an inquiry about the adjustment value information is not received in step S614, the processing returns to step S606.

FIG. 9 illustrates a sheet setting screen for the sheet storage deck 1. The sheet setting screen for the sheet storage deck 1 is displayed when image data is drawn in the video memory according to an instruction from the CPU 301, and the image data drawn in the video memory is output to the display apparatus 113 as video signals.

A screen 701 is the initial screen of the sheet storage unit screen for the sheet storage deck 1. The screen 701 displays a sheet information display area 702, a sheet list display area 703, an assignment button 704, an update sheet list button 705, and a close button 706.

The sheet information display area 702 displays setting information of the currently selected sheet. When the user presses the sheet storage unit button 406 and the screen 701 opens, the sheet information display area 702 displays information of the sheet currently assigned to the sheet storage deck 1. According to the present embodiment, pressing the sheet storage unit button 406 refers to user's operations for positioning a cursor 801 at the sheet storage unit button 406 and then pressing the button of the pointing device 115 to click the sheet storage unit button 406. Of course, the screen 701 can be displayed with an operation other than clicking the sheet storage unit button 406.

The sheet list display area 703 displays the sheet information managed by the print control apparatus 102 and the printing apparatus 103 in list form. When the user selects a sheet from the sheet list displayed in the sheet list display area 703, the information about the selected sheet is displayed in the sheet information display area 702.

Each input item in the sheet information display area 702 will be described below. A text field 707 is an area for inputting the name of a sheet. To change the name displayed in the text field 707, the user inputs a text in the text area by using the keyboard 114. In the subsequent descriptions, a description of using the keyboard 114 for text input will be omitted.

When the user presses the update sheet list button 705, the changed information is reflected to the sheet information of the print control apparatus 102 and the printing apparatus 103. This also applies to a case where a setting is changed.

A text field 708 is an area for inputting the grammage. The operation for inputting the grammage is similar to the operation for the text field 707, and a redundant description thereof will be omitted.

A combo box 709 is an area for displaying sheet size information. The user can select a predetermined size from the list of size information displayed. A combo box 710 is an area for displaying surface nature information. A combo box 711 is an area for displaying feature information. A combo box 712 is an area for displaying color information. A combo box 713 is an area for displaying information of the second side of a double-sides sheet. A combo box 714 is an area for displaying grain information. Operations for the combo boxes 710, 711, 712, 713, and 714 are similar to the operation for the combo box 709, and redundant descriptions thereof will be omitted.

A setting area 715 is an area for collectively displaying settings related to the adjustment items. Some of the adjustment items are illustrated as examples. As illustrated in FIG. 9, when the setting area 715 includes many adjustment items, the user can check adjustment items not currently being displayed, by operating a slider bar 716. The adjustment items displayed in the setting area 715 include adjustment items for determining operating conditions of the printing apparatus 103 and the finisher when the printing apparatus 103 prints an image on the sheet. The printing apparatus 103 receives the adjustment values of the adjustment items from the print control apparatus 102 and stores the adjustment values in the storage device 211. At the time of image printing, the printing apparatus 103 reads the adjustment values of the adjustment items stored in the storage device 211 and controls the operations of the printing unit 210 and the finisher connected to the printing apparatus 103.

A setting item button 717 is a button for setting the image position adjustment and displays whether the current sheet has already been adjusted. When the current sheet has already been adjusted, the setting item button 717 displays "adjusted". When the current sheet has not been adjusted, the setting item button 717 displays "no adjustment". When the user presses the setting item button 717, an adjustment screen opens. The user can input various adjustment values in the adjustment screen.

A setting item button 718 is a button for setting the curl correction. A setting item button 719 is a button for adjusting the saddle stitching fold position. The setting item button 719 displays, for example, the current adjustment value in mm.

A setting item button 720 is a button for adjusting the creep correction amount. A setting item button 721 is a button for adjusting the saddle stitching fold position. A setting item button 722 is a button for adjusting the saddle stitch position. The setting item button 723 is a button for adjusting the secondary transfer voltage. A setting item button 724 is a button for adjusting the tip portion secondary transfer voltage.

A setting item button 725 is a button for adjusting the secondary transfer destaticizing bias. A setting item button 726 is a button for adjusting the primary transfer voltage. Operations for the setting item buttons 718 to 726 are similar to the operation for the setting item button 717, and redundant descriptions thereof will be omitted.

The following describes the sheet list display area 703. A table 727 displays a sheet list. The sheet information is displayed to each column, and the sheet type is displayed to each row.

To display other pieces of sheet information than the currently displayed sheet information, the user operates a slider bar 728.

To display sheet types other than the currently displayed sheet types, the user operates a slider bar 729. A row 730 indicates parameters of the sheet type of which the adjustment items are currently displayed in the sheet information display area 702. The row 730 is highlighted so that the user recognizes that the row is selected.

Rows 731 to 733 are parameters of sheets of which the adjustment items are not currently displayed in the sheet information display area 702. When the user selects any one of the deselected rows 731 to 733 from the table 727 in the sheet list display area 703, the information about the selected sheet is displayed in the sheet information display area 702. In this state, the user can assign a newly selected sheet to the sheet storage deck 1 by pressing the Assignment button 704. To close the screen 701 without changing any setting, the user presses the Close button 706.

A screen of the sheet management application according to the present embodiment will be described below with reference to FIG. 10. Only differences from the top screen 401 illustrated FIG. 6A will be described below.

The cursor 801 is an object which indicates the coordinates position of the pointing device 115. More specifically, the user moves the cursor 801 by operating the pointing device 115.

In the screen 402, when the sheet storage unit button 406 is pointed by the cursor 801, a tooltip 802 is displayed. The tooltip 802 displays a part of the sheet information of the sheet stored in the pointed sheet storage unit. More specifically, the tooltip 802 is displayed, for example, when the print control apparatus 102 detects that a predetermined time period has elapsed since the cursor 801 enters the display area of the sheet storage unit button 406. The predetermined time period in this case is 0 seconds or more including the moment the cursor 801 enters the display area. A tooltip is an area for displaying the information about the portion pointed by the cursor. According to the present embodiment, a tooltip displays the attribute information of the sheet corresponding to the identification information of the sheet pointed by the cursor 801 and displays adjusted adjustment items of which the setting values have been changed from the default values from among the setting values set in association with the sheet information. Moving the position of the cursor 801 to the area of a displayed button is referred to as "mouse-over". Pointing the sheet storage unit button 406 with the cursor 801 is referred to as "performing mouse-over on the sheet storage unit button 406".

When the portion pointed by the cursor 801 moves out from the sheet storage unit button 406, the display unit 111 ends display of the tooltip 802. For example, when the portion pointed by the cursor 801 moves from the sheet storage unit button 406 to the sheet storage unit button 408, the display unit 111 ends display of the tooltip 802. Then, the display unit 111 displays details of the identification information of the sheet displayed on the sheet storage unit button 408.

When the tooltip 802 is displayed, the arrow of the tooltip 802 can be helpful for allowing the user to recognize which sheet storage unit is pointed by the cursor 801. For example, even if sheet storage unit buttons are densely displayed, this arrow allows the user to visually recognize the sheet storage unit storing the sheet of which the sheet information is displayed in the tooltip 802.

Although, in the present embodiment, the tooltip 802 is displayed at the timing when a predetermined time period has elapsed since the cursor 801 enters the area of a sheet storage unit button, the configuration is not limited thereto. For example, after the cursor 801 enters the area of a sheet storage unit button, the tooltip 802 can be displayed when the user presses a predetermined key of the keyboard 114, right-clicks the pointing device 115, or double-clicks the pointing device 115.

Although, in the present embodiment, the cursor 801 is used, the tooltip 802 can be displayed in a different way. For example, when the screen 402 serves as a touch panel, the tooltip 802 can be displayed when a predetermined time period has elapsed while the user keeps selecting (pressing) the sheet storage unit button 406. However, the predetermined time period in this case does not include 0 seconds.

The tooltip 802 is a screen for displaying a part of the sheet information of the sheet stored in the sheet storage deck 1. More specifically, as a part of the sheet information, the sheet attributes including a sheet surface nature, a size, grammage, color, etc., and the adjustment items adjusted from the initial values (initial setting values) by the user from among a plurality of adjustment items illustrated in FIG. 11 (described below) are displayed in an associated way. The tooltip 802 can distinguishably display adjusted adjustment items of a plurality of adjustment items.

An adjustment value adjusted from the initial value includes an adjustment value which has been once adjusted from the initial value to another value and then changed back to the same value as the initial value. More specifically, even if the adjustment value is changed back to the same adjustment value as the initial value, the adjustment value is not regarded as the initial value. Although, in the present embodiment, the tooltip 802 is displayed in pop-up form, the tooltip 802 can be displayed in slide form as long as it is distinguishably displayed so as to be visually recognized. In addition, a message can be displayed instead of the tooltip 802.

The following description will be given for a screen for displaying a plurality of adjustment items for adjusting the finishing state of printing, with reference to FIG. 11. Referring to FIG. 11, a screen 902 displayed in a screen 901 displays a plurality of adjustment items, check boxes 903 each corresponding to a different one of the adjustment items, an apply button 904, and a close button 905.

The screen 902 is a display reception screen for receiving user's selection about whether to display the adjustment item of which the adjustment value has been adjusted from the initial value by the user as a part of the sheet information in the tooltip 802. The user checks the check box 903 to display the adjustment item or does not check the check box 903 not to display the adjustment item.

Although, in FIG. 11, only adjustment items can be displayed or undisplayed in the tooltip 802, this configuration can be applicable to the sheet attributes, such as a sheet size, grammage, etc.

Figure 12:
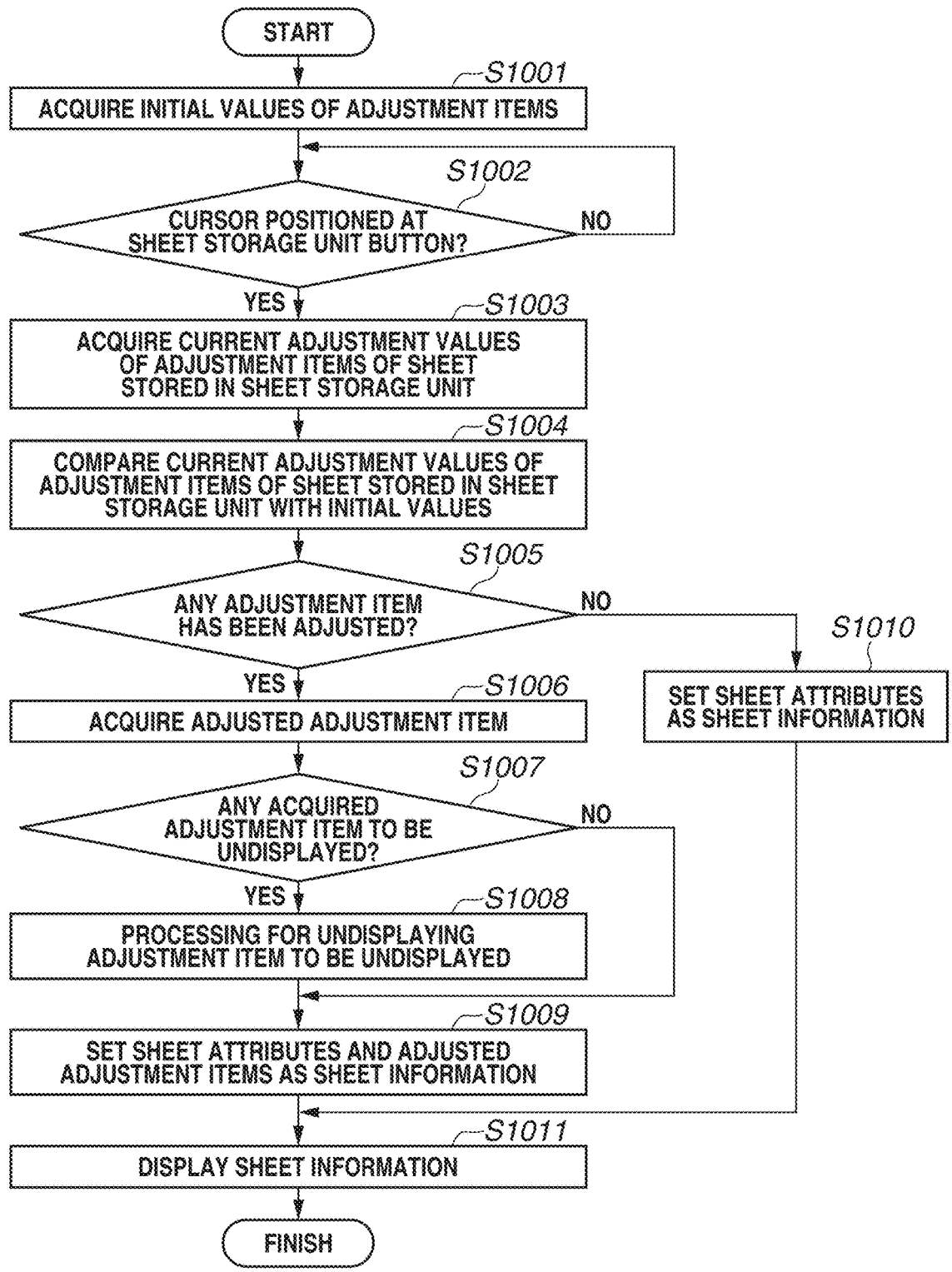
FIG. 12 is a flowchart illustrating processing for displaying sheet information of the sheet stored in a sheet storage unit.

A description will be given for the operation performed by the print control apparatus 102 to display the screen of the sheet management application illustrated in FIG. 10, with reference to the flowchart illustrated in FIG. 12. The program for performing the processing of the flowchart illustrated in FIG. 12 is stored in the storage device 309 illustrated in FIG. 2. The program is loaded into the RAM 302 and then executed by the CPU 301.

The print control apparatus 102 starts the processing procedure of the flowchart, for example, when the activation processing thereof is completed. However, the timing for starting the flowchart is not limited thereto. The flowchart can be started as a part of the processing in step S508 illustrated in FIG. 7 or started at other timings.

In step S1001, the print control apparatus 102 acquires the initial values of a plurality of adjustment items of the sheet information from the storage device 309.

In step S1002, the print control apparatus 102 determines whether the cursor 801 is positioned at a sheet storage unit button. In a case where the print control apparatus 102 determines that the cursor 801 is positioned at a sheet storage unit button (YES in step S1002), the processing proceeds to step S1003. The case that the cursor 801 is determined to be positioned at a sheet storage unit button refers to the case that the elapsed time measured since the cursor 801 enters the area of the sheet storage unit button 406 in the screen 402 exceeds a predetermined threshold value. Such determination is made in a case where the measured time exceeds the predetermined threshold value in the present embodiment. However, such determination can be made at a moment when the cursor 801 enters the area of the sheet storage unit button 406.

On the other hand, in a case where the print control apparatus 102 determines that the cursor 801 is not positioned at a sheet storage unit button (NO in step S1002), the processing returns to step S1002. In step S1002, the print control apparatus 102 waits until the cursor 801 is determined to be positioned at a sheet storage unit button. In this example, descriptions will be made on the premise that the sheet storage deck 1 is selected.

In step S1003, the CPU 301 acquires from the storage device 309 the current adjustment values (the adjustment values at a predetermined timing) of the adjustment items of the sheet stored in the sheet storage deck 1. Upon completion of step S1003, the processing proceeds to step S1004.

In step S1004, the CPU 301 compares the current adjustment values of the sheet stored in the sheet storage deck 1 acquired in step S1003 with the initial values of the sheet stored in the sheet storage deck 1 acquired in step S1001.

In step S1005, based on the comparison result acquired in step S1004, the CPU 301 determines whether there is any adjustment item of which the adjustment value has been adjusted from the initial value. In a case where there is an adjustment item of which the adjustment value has been adjusted from the initial value (YES in step S1005), the processing proceeds to step S1006.

In step S1006, the CPU 301 acquires the adjustment items of which the adjustment values have been adjusted from the initial values.

In step S1007, the CPU 301 determines whether, in the storage device 309, there is any sheet attribute to be undisplayed from among the sheet information displayed in the tooltip 802 illustrated in FIG. 10. However, in the screen 901 illustrated in FIG. 11, the user is allowed to set whether to display in the tooltip 802 an adjustment item of which the adjustment value has been adjusted from the initial value. Although, in FIG. 11, checked adjustment items are set to be displayed, unchecked adjustment items can be set to be displayed. In addition, adjustment items may not be checked as long as adjustment items to be displayed can be recognized.

In a case where there is no sheet attribute to be undisplayed in the tooltip 802 illustrated in FIG. 10 in the storage device 309 (NO in step S1007), the processing proceeds to step S1009.

Meanwhile, when there is an adjustment item to be undisplayed in the sheet information displayed in the tooltip 802 although the adjustment item has been adjusted from the initial value (YES in step S1007), the processing proceeds to step S1008. In step S1008, the CPU 301 performs processing for undisplaying adjustment items.

In step S1009, the CPU 301 sets the sheet attributes, such as a sheet size, grammage, etc., and adjusted adjustment items, as sheet information which can be displayed as the tooltip 802 illustrated in FIG. 10.

In step S1011, the CPU 301 displays the tooltip 802. In this case, from among adjusted adjustment items, the CPU 301 does not display the adjustment items processed to be undisplayed in step S1008. Then, the processing exits the flowchart illustrated in FIG. 12.

On the other hand, in a case where there is no adjustment item of which the adjustment value (parameter) has been adjusted (NO in step S1005), the processing proceeds to step S1010. In step S1010, the CPU 301 selects only the sheet attributes, such as a sheet size, grammage, etc., as the sheet information. After completion of step S1010, the processing proceeds to step S1011. In step S1011, the CPU 301 displays the sheet information in the tooltip 802. After completion of step S1011, the processing exits the processing procedure of the flowchart.

According to the present embodiment, in step S1007, the CPU 301 can determine whether there is an adjustment item to be displayed and, in step S1008, perform processing for displaying adjustment items which have been adjusted and to be displayed.

According to the present embodiment, to temporarily disable a specific sheet storage unit storing no sheet, the CPU 301 can display that the sheet storage unit is disabled when the user positions the cursor 801 at the sheet storage unit button.

As described above, the configuration according to the present embodiment makes it possible to provide the user with a display screen which acquires and displays the adjustment items of which adjustment values have been set. This allows the user to visually recognize adjustment items of which adjustment values have been set to a predetermined sheet.

Figure 15:
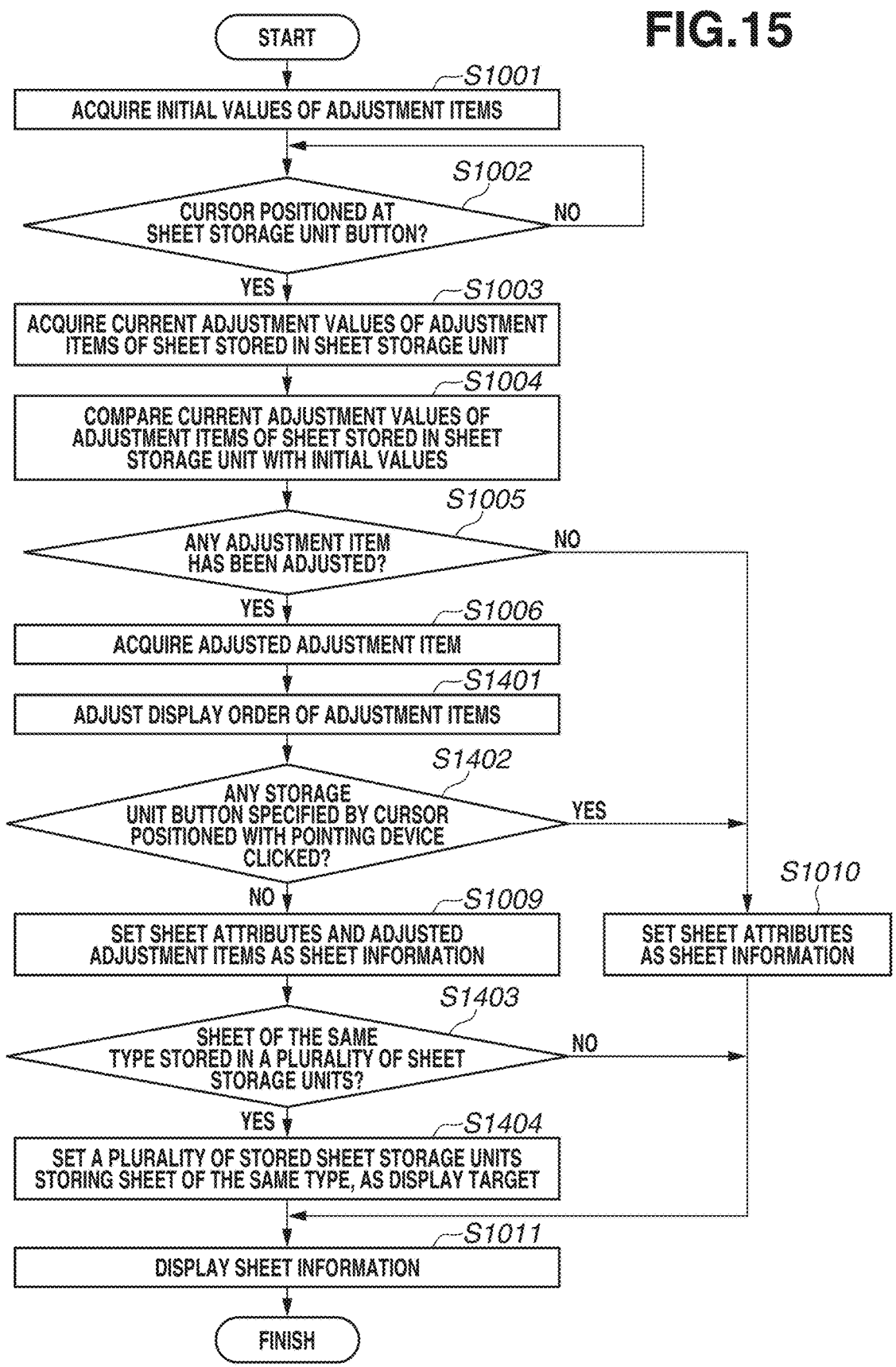
FIG. 15 is another flowchart illustrating processing for displaying sheet information of the sheet stored in a sheet storage unit.

The print control apparatus 102 according to a second embodiment will be described below with reference to FIGS. 13 to 15. The screen of the sheet management application according to the present embodiment will be described below with reference to FIG. 13. Only differences from the top screen 401 illustrated FIG. 10 will be described below.

According to the configuration of the present embodiment, the same sheet types are set in a plurality of sheet storage units. For example, three different sheet storage units stores sheets having the same attributes, i.e., one-side coated sheets (the sheet storage deck 1, the sheet storage deck 2, and the manual feed tray).

For example, when the user positions the cursor 801 at the sheet storage deck 1 from among the three sheet storage units, the tooltip 802, a screen 1106, and a screen 1107 are displayed for the sheet storage deck 1, the sheet storage deck 2, and the manual feed tray, respectively. The tooltip 802, the screen 1106, and the screen 1107 display the sheet information. Adjusted adjustment items of a plurality of adjustment items can be distinguishably displayed. Although, in FIG. 13, different adjustment items of the displayed sheet information are displayed for the three sheet storage units, the same adjustment items can be displayed.

In a case where sheets having the same sheet type are stored in a plurality of sheet storage units in this way, the print control apparatus 102 allows the user to be notified, when the user positions the cursor 801 at one sheet storage unit button, that the sheet having the same sheet type is stored also in other sheet storage units.

The print control apparatus 102 also allows the user to easily check adjustment statuses of the adjustment items of the sheets stored in the sheet storage units storing the sheets having the same sheet type.

Therefore, a description will be given of an operation of the present embodiment, which is an operation in addition to the first embodiment and is performed in a case where sheets of the same sheet type are set in a plurality of sheet storage units and the cursor 801 is positioned at one of the sheet storage unit buttons. A description will be also give of a procedure for changing the display order of the adjustment attributes and a procedure for changing the contents of the sheet information, set for the sheet storage unit, which is displayed when the cursor 801 is positioned at the sheet feed stage under a certain condition, with reference to FIGS. 14 and 15.

A screen for displaying a plurality of adjustment items for adjusting the finishing state of printing will be described below with reference to FIG. 14. Only differences from the screen 901 illustrated FIG. 11 will be described below. A screen 1101 corresponds to the screen 901, a screen 1102 corresponds to the screen 902, an apply button 1104 corresponds to the apply button 904, and a close button 1105 corresponds to the close button 905.

The screen 1101 illustrated in FIG. 14 is a screen (arrangement order reception screen) for receiving the display order of adjusted adjustment items to be displayed in the tooltip 802. The screen 1101 for adjustment items includes the screen 1102.

Items arranged in the screen 1102 include the name of each adjustment attribute and a text box 1103 for setting the display order of adjustment attribute names in the tooltip 802 when the parameter of the adjustment attribute has been adjusted.

Referring to FIG. 14, a number indicating the display order is entered in the text box 1103 by the user. When there is a plurality of adjusted adjustment items, the CPU 301 displays the adjustment item names in the tooltip 802 according to the display order entered in the text box 1103. In the frame of the tooltip 802, adjustment items can be displayed from the top downward or adjustment attributes can be sequentially displayed from left to right in the order specified in the text boxes 1103. However, adjustment items of which the display order is not entered in the text boxes 1103 can be displayed in any order after adjustment items of which the display order is entered.

Although, in the present embodiment, the display order in the tooltip 802 can be set only for adjustment items, the display order can be changed for sheet attributes. The screens illustrated in FIGS. 11 and 14 can be used together. Such a configuration allows setting the display order of adjusted adjustment items and setting whether to display or undisplay each adjustment item.

A description will be given of the operation performed by the print control apparatus 102 to display the screen of the sheet management application illustrated in FIG. 13, with reference to the flowchart illustrated in FIG. 15. The program for performing the processing of the flowchart illustrated in FIG. 15 is stored in the storage device 309 illustrated in FIG. 2. The program is loaded into the RAM 302 and then executed by the CPU 301. The processing in steps S1001 to S1011 is similar to the processing illustrated in FIG. 12, and redundant descriptions thereof will be omitted.

In step S1401, the CPU 301 acquires information of the display order of sheet attributes input in the screen 1102 by the user. After completion of step S1401, the processing proceeds to step S1402.

In a case where a sheet storage unit button is pointed by the cursor 801 with the pointing device 115 clicked (YES in step S1402), the processing proceeds to step S1010 and S1011. After the processing proceeds to step S1011, the processing is similar to the processing according to the first embodiment.

On the other hand, when a sheet storage unit button is pointed by the cursor 801 with the pointing device 115 not clicked (NO in step S1402), the processing proceeds to step S1009. In step S1009, the CPU 301 sets the sheet attributes, including a sheet size, grammage, etc., and adjusted adjustment items as sheet information displayable in the tooltip 802 illustrated in FIG. 13.

In step S1403, the CPU 301 determines whether the sheet type of the sheet stored in the sheet storage unit pointed by the cursor 801 in step S1002 coincides with the sheet types of the sheets stored in sheet storage units other than the pointed sheet storage unit. In step S1403, in a case where the sheet type of the sheet stored in the sheet storage unit pointed by the cursor 801 coincides with the sheet types of the sheets stored in sheet storage units other than the pointed sheet storage unit (YES in step S1403), the processing proceeds to step S1404.

Meanwhile, in a case where the sheet type of the sheet stored in the sheet storage unit pointed by the cursor 801 does not coincide with the sheet types of the sheets stored in sheet storage units other than the pointed sheet storage unit (NO in step S1403), the processing proceeds to step S1011. The subsequent processing is similar to the processing according to the first embodiment.

In step S1404, as a display target, the CPU 301 sets the sheet information of sheet storage units storing the same sheet type as the sheet type of the sheet stored in the sheet storage unit pointed by the cursor 801 in step S1002. Then, the processing proceeds to step S1011. In step S1011, the CPU 301 displays the sheet information including adjustment items for a plurality of sheet storage units like the screens 804, 1106, and 1107 illustrated in FIG. 13. Then, the processing exits the flowchart.

As described above, the configuration according to the present embodiment also makes it possible to provide the user with a display screen which acquires and displays the adjustment items of which adjustment values have been set. This allows the user to visually recognize adjustment items of which adjustment values have been set for a predetermined sheet type.

Figure 13:
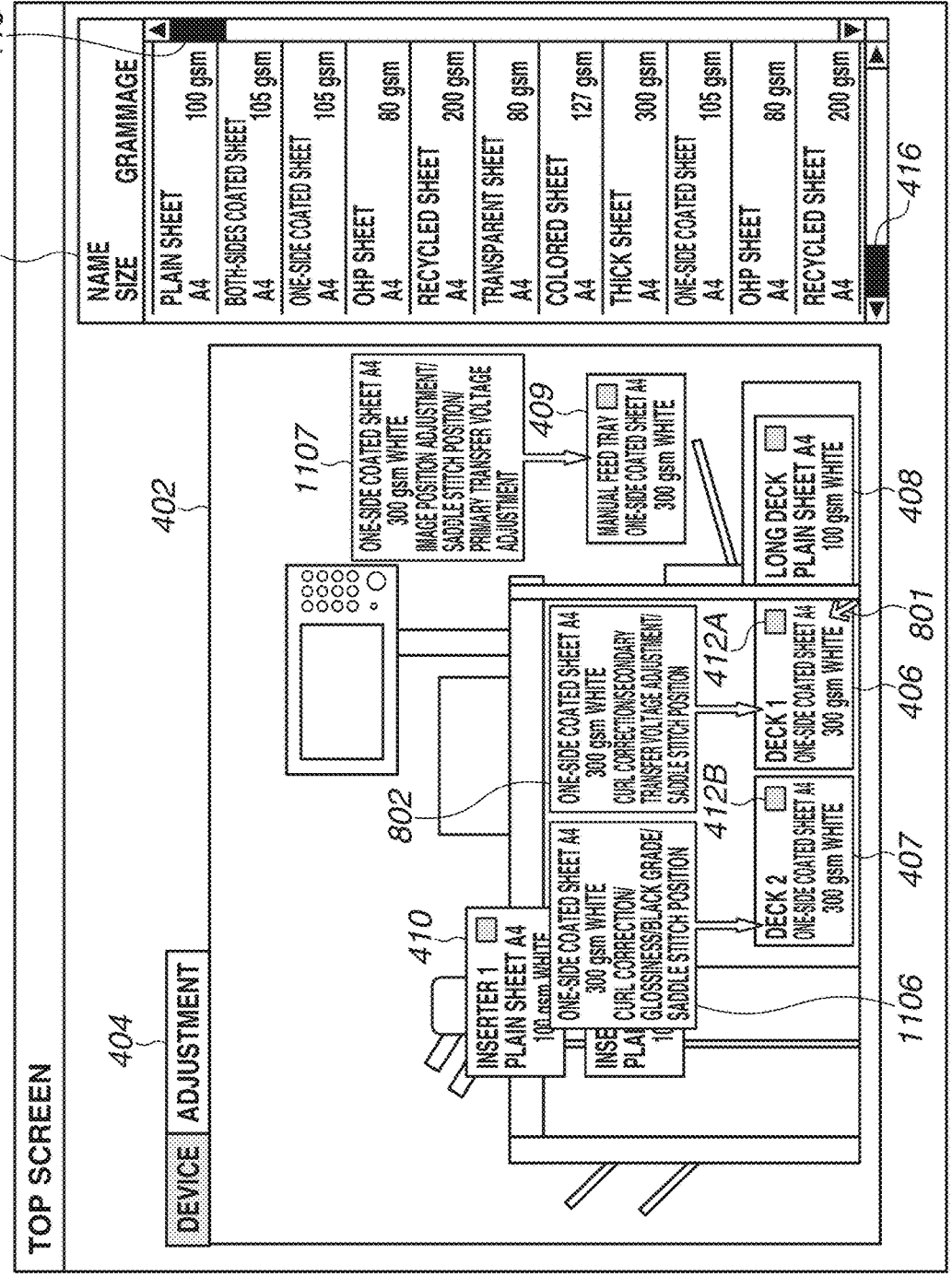
FIG. 13 is a diagram illustrating a screen of the sheet management application.

The arrows illustrated in FIG. 13 can be helpful for allowing the user to easily recognize the correspondence between each of the screens 804, 1106, and 1107 and the sheet information of sheet storage units.

According to the present embodiment, in step S1402, the CPU 301 performs processing for displaying the sheet attributes as the sheet information when a sheet storage unit button is pointed by the cursor 801 with the pointing device 115 clicked. Then, the CPU 301 performs processing for displaying the sheet attributes and adjusted adjustment items as the sheet information when a sheet storage unit button is pointed by the cursor 801 with the pointing device 115 not clicked. In this way, the CPU 301 can change the display contents by changing the condition of when a sheet storage unit button is pointed by the cursor 801.

The condition of when a sheet storage unit button is pointed by the cursor 801 in step S1402 is not limited to the above-described condition. For example, the display contents can be changed depending on a right-click and a left-click of the mouse.

According to the present embodiment, the print control apparatus 102 allows the user to visually recognize the sheet attributes and adjusted adjustment items without performing a screen transition for a plurality of sheet storage units storing sheets of the same sheet type.

By change of the display order in a predetermined way when adjusted adjustment items are displayed in the tooltip 802, it is possible to refine the operability for grasping the sheet stored in the sheet storage unit and adjustment statuses of the adjustment attributes of the sheet.

The sheet management application of the print control apparatus 102 according to a third embodiment will be described below with reference to FIGS. 16A, 16B, and 17. Only differences from the top screen 401 illustrated FIGS. 6A and 6B will be described below.

The screen illustrated in FIG. 16A differs from the screen illustrated in FIG. 6A in the way that adjusted adjustment items are distinguishably displayed for the sheet stored in each sheet storage unit.

A message field 1501 is an area for notifying the user of adjusted adjustment items for the sheet stored in a sheet storage unit. The message field 1501 makes it possible to distinguishably display adjusted adjustment items of a plurality of adjustment items for the sheet stored in a sheet storage unit.

Although, in FIG. 16A, a message in the text format is displayed as an example, only the names of adjustment items can be displayed. This text can be displayed in a fixed length or displayed as a sentence moving on the screen.

Although, in FIG. 16A, adjusted adjustment items are distinguishably displayed by notifying the user of adjusted adjustment items using the message field 1501, the configuration is not limited thereto. For example, by using sound, the print control apparatus 102 can notify the user of adjustment items that have been adjusted, to distinguish adjustment items.

FIG. 16B illustrates a screen for distinguishably displaying adjusted adjustment items in the sheet setting screen of the sheet management application. For example, when "Image Position Adjustment" and "Secondary Transfer Voltage Adjustment" illustrated in FIG. 16B have been adjusted, the CPU 301 encloses the two adjustment items in a frame line 1601 to distinguishably display that the two adjustment items have been adjusted. Referring to FIG. 16B, a message field 1602 distinguishably displays that the two adjustment items have been adjusted.

Although each adjustment item is distinguishably displayed by using the frame line 1601, the distinguishing method is not limited thereto. For example, unadjusted adjustment items can be undisplayed or grayed out, adjusted adjustment items can be displayed in different colors, the background of adjusted adjustment items can be highlighted, or a specific mark can be supplied to the names of adjusted adjustment items.

The message field 1602 of the sheet setting screen can display which adjustment items (parameters) have been adjusted in text form.

A description will be given of the operation performed by the print control apparatus 102 to display the screen of the sheet management application illustrated in FIGS. 16A and 16B, with reference to the flowchart illustrated in FIG. 17. The program for performing the processing of the flowchart illustrated in FIG. 17 is stored in the storage device 309 illustrated in FIG. 2. The program is loaded into the RAM 302 and then executed by the CPU 301. The processing in steps S1001 to S1011 is similar to the processing illustrated in FIG. 12, and redundant descriptions thereof will be omitted.

In step S1801, the CPU 301 displays which adjustment items from among a plurality of sheet storage units have been adjusted in the message field 1501 illustrated in FIG. 16A and/or the message field 1602 illustrated in FIG. 16B. Then, the processing proceeds to step S1802.

In step S1802, the CPU 301 waits until the user presses a predetermined sheet storage unit button. When a predetermined sheet storage unit button is pressed (YES in step S1802), the processing proceeds to step S1005.

In step S1005, based on the comparison result acquired in step S1004, the CPU 301 determines whether there is any adjustment item of which the adjustment value has been adjusted from the initial value. When there is an adjustment item of which the adjustment value has been adjusted from the initial value (YES in step S1005), the processing proceeds to step S1804.

In step S1804, the CPU 301 performs processing for distinguishably displaying adjusted adjustment items by using the frame line 1601 in the screen 701 illustrated in FIG. 16B. Then, the processing proceeds to step S1011.

In step S1011, the CPU 301 displays the sheet information in the tooltip 802. Then, the processing exits the flowchart.

Meanwhile, when the CPU 301 determines that there is no adjustment item of which the adjustment value has been adjusted (NO in step S1005), the processing proceeds to step S1011. After completion of step S1011, the processing exits the flowchart.

As described above, the configuration according to the present embodiment also makes it possible to provide the user with a display screen which acquires and displays the adjustment items of which adjustment values have been set. This allows the user to visually recognize adjustment items of which adjustment values have been set to predetermined sheets.

Although, in the present embodiment, the CPU 301 provides the frame line 1601 and the message fields 1501 and 1602, the frame line 1601 and the message fields 1501 and 1602 are not needed to be used together. For example, if the message field 1501 is used and the frame line 1601 is not, the CPU 301 performs step S1801 and skips steps S1005 and S1804. If the frame line 1601 is used and the message fields 1501 and 1602 are not, the CPU 301 performs steps S1005 and S1804 and skips step S1801.

The print control apparatus 102 according to a fourth embodiment will be described below with reference to FIGS. 18A, 18B, and 19.

The screen of the sheet management application according to the present embodiment will be described below with reference to FIGS. 18A and 18B. Only differences from the screen 701 illustrated FIG. 9 will be described below.

FIGS. 18A and 18B illustrate screens for preferentially displaying adjusted adjustment items over the adjustment items in the sheet setting screen of the sheet management application. A setting area 1915 includes a screen open/close area 1902 for covering at least a part of adjustment items, and a screen open/close button 1901 for controlling the screen open/close area 1902 between the closed state (state where at least a part of adjustment items is undisplayed) and the open state (state where adjustment items is displayed).

According to the present embodiment, when the sheet setting screen is opened, adjusted adjustment items are preferentially displayed. This configuration makes it possible to distinguishably display adjusted adjustment items of a plurality of adjustment items.

Adjustment items are not constantly displayed but displayed together with necessary adjustment items as required. For example, when "Image Position Adjustment" and "Secondary Transfer Voltage Adjustment" are completed, the CPU 301 rearranges the adjustment items to be displayed in the setting area 1915, and display "Image Position Adjustment" and "Secondary Transfer Voltage Adjustment" at the top of the setting area 1915 (FIG. 18A).

In the screen illustrated in FIG. 18A, when the user presses the screen open/close button 1901, the screen open/close area 1902 enters the closed state where the unadjusted adjustment items displayed below the "Image Position Adjustment" and "Secondary Transfer Voltage Adjustment" are undisplayed (FIG. 18B). The area to be covered by the screen open/close area 1902 when the screen open/close area 1902 is closed can be arbitrarily set. For example, a part of unadjusted adjustment items may not be covered or the sheet list display area 703 may be covered. When the screen open/close area 1902 is closed, the slider bar 716 may or may not be displayed.

When the screen open/close area 1902 is closed, for example, the screen open/close button 1901 is displayed as initial display. When the screen open/close area 1902 is opened, for example, the screen open/close button 1901 is rightward rotated by 90 degrees. In this way, display of the screen open/close button 1901 can be changed according to the state of the screen open/close area 1902.

The displayable area can be increased in the display screen by undisplaying unnecessary adjustment items in the screen 701. In the displayable area, for example, other information including information of consumables and information of tint adjustment can be displayed.

In this way, in the screen 701, the print control apparatus 102 makes it possible to provide the user with other information than the sheet information.

A description will be given of the operation performed by the print control apparatus 102 to display the screen of the sheet management application illustrated in FIGS. 18A and 18B, with reference to the flowchart illustrated in FIG. 19. The program for performing the processing of the flowchart illustrated in FIG. 19 is stored in the storage device 309 illustrated in FIG. 2. The program is loaded into the RAM 302 and then executed by the CPU 301. The processing in steps S1001 to S1011 is similar to the processing illustrated in FIG. 12, redundant descriptions thereof will be omitted.

In step S2001, the CPU 301 waits until the user presses a combination of shortcut keys for displaying the sheet information of sheet storage units. More specifically, the CPU 301 does not display the adjustment items acquired in step S1004 in the screen until the user presses a shortcut key.

In step S2002, the CPU 301 waits until the user presses a predetermined sheet storage unit button. In a case where the user presses the predetermined sheet storage unit button (YES in step S2002), the processing proceeds to step S2003.

In step S2003, the CPU 301 determines whether there is any adjustment item of which the adjustment value has been adjusted from the initial value, based on the comparison result acquired in step S1004. In a case where there is an adjustment item of which the adjustment value has been adjusted from the initial value (YES in step S2003), the processing proceeds to step S2004.

In step S2004, the CPU 301 rearranges adjusted adjustment items so as to be sequentially arranged from the top of the group of a plurality of adjustment items in the setting area 1915. More specifically, as illustrated in FIGS. 18A and 18B, the CPU 301 arranges adjusted adjustment items from the first row when a plurality of adjustment items is arranged in list form. Upon completion of step S2004, the processing proceeds to step S2005.

In step S2005, the CPU 301 displays adjusted adjustment items in the sheet setting screen. In this case, the screen open/close area 1902 is in the closed state where unadjusted adjustment items are not displayed. After completion of step S2005, the processing proceeds to step S2006.

In step S2006, the CPU 301 waits until the user presses the screen open/close button 1901. In a case where the user presses the screen open/close button 1901 (YES in step S2006), the processing proceeds to step S2007.

In step S2007, the CPU 301 opens the screen open/close area 1902 to open the area undisplayed by the screen open/close area 1902 to display unadjusted adjustment items. After completion of step S2007, the CPU 301 opens the sheet setting screen folded along a border of the screen open/close area 1902, and also displays unadjusted adjustment attributes. Then, the processing exits the flowchart.

Meanwhile, in a case where the CPU 301 determines that there is no adjustment item of which the adjustment value has been adjusted (NO in step S2003), the processing proceeds to step S2008.

In step S2008, the CPU 301 does not display adjustment items in the sheet setting screen. In this case, the screen open/close area 1902 is closed, and unadjusted adjustment items are undisplayed.

Figure 19:
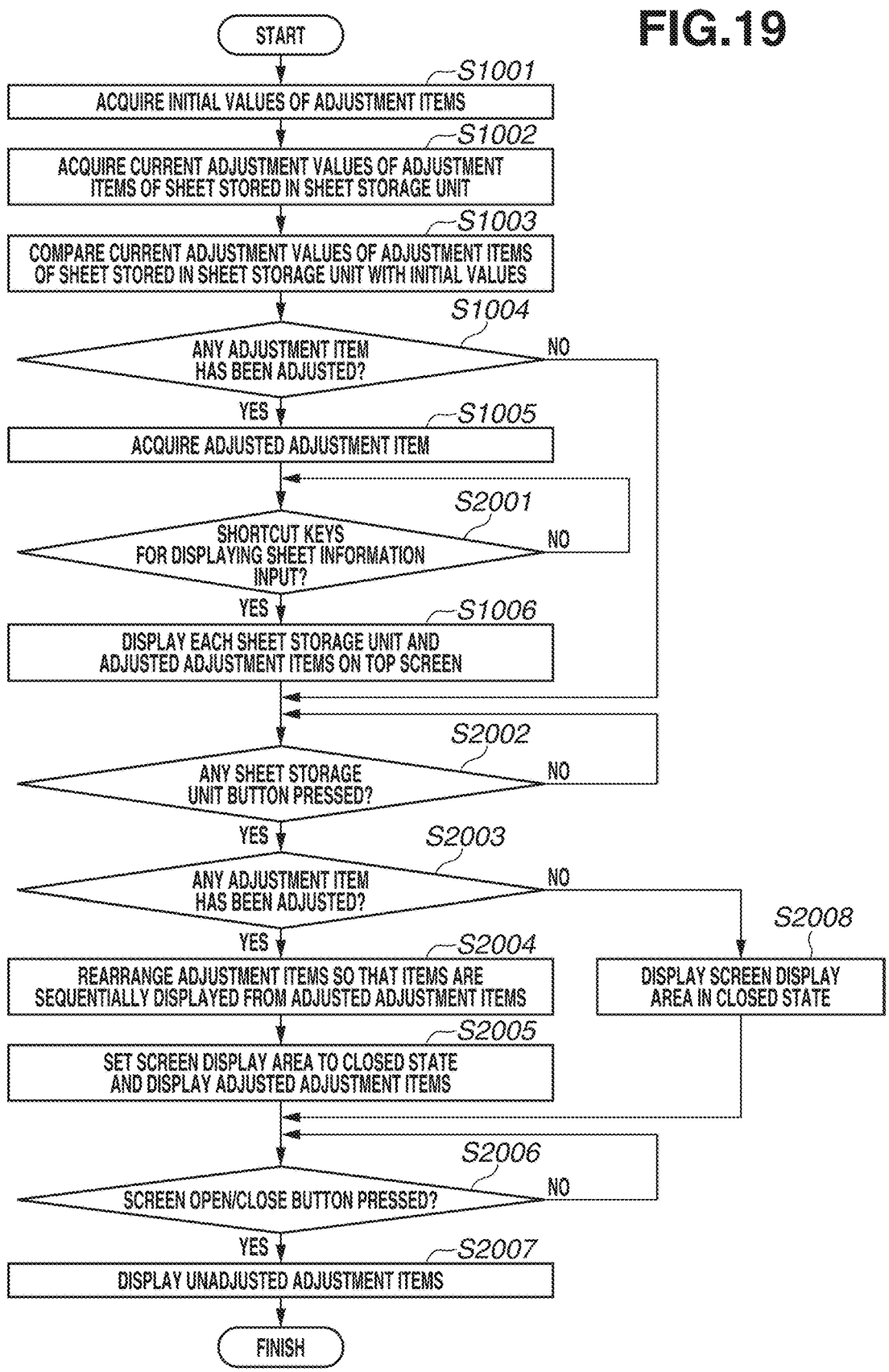
FIG. 19 is yet another flowchart illustrating processing for displaying sheet information of the sheet stored in a sheet storage unit.

In steps S2005 to S2008 illustrated in FIG. 19, as the initial state immediately after the sheet setting screen is opened, the screen open/close area 1902 is in the closed state where unadjusted adjustment items are undisplayed. However, in step S2005, the screen open/close area 1902 can be opened in the initial state. In this case, in step S2006 (following step S2005), the screen open/close area 1902 closes when the user presses the screen open/close button 1901. In step S2007, the screen open/close area 1902 undisplays unadjusted adjustment items.

As described above, the configuration according to the present embodiment also makes it possible to provide the user with a display screen which acquires and displays the adjustment items of which adjustment values have been set. This allows the user to visually recognize adjustment items of which adjustment values have been set to a predetermined sheet.

The flowchart according to the present embodiment is to be considered as an example, and the processing is not limited thereto. For example, adjusted adjustment items can be displayed while the number of adjustment items to be displayed is being changed with changing area of the sheet setting screen as the user enlarges or reduces the sheet setting screen.

According to the present embodiment, when the user performing an operation by using shortcut keys on the keyboard 114 in step S2001, the CPU 301 displays the adjustment attributes with adjusted parameters in the top screen of the sheet management application. This makes it possible to refine the operability for grasping the sheet stored in the sheet storage unit and adjustment statuses of the adjustment attributes of the sheet.

However, step S2001 can be omitted. Instead, for example, adjusted adjustment items can be displayed when the user holds a portable terminal over the print control apparatus 102. In addition, a screen for notifying the user of adjusted adjustment attributes can be periodically popped up. Alternatively, adjusted adjustment items can be displayed when the CPU 301 detects the opening or closing of a sheet storage unit.

OTHER EMBODIMENTS

While the present disclosure has specifically been described based on the above-described examples and embodiments, the spirit and scope of the present disclosure are not limited to specific descriptions within the specification.

The present disclosure can also be achieved when a program for implementing at least one of the functions according to the above-described embodiments is supplied to a system or apparatus via a network or storage medium, and at least one processor in a computer of the system or apparatus reads and executes the program. Further, the present disclosure can also be achieved by a circuit (for example, an application specific integrated circuit (ASIC)) for implementing at least one function.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2017-128950, filed Jun. 30, 2017, which is hereby incorporated by reference herein in its entirety.

What is claimed is:

1. A print control apparatus to communicate with a printing apparatus, the print control apparatus comprising:
    a memory configured to store, in a database, identification information of a plurality of sheets and values of a plurality of items, wherein a piece of identification information among the identification information is associated with at least one of the values;
    a display configured to display the identification information of the plurality of sheets stored in the memory; and
    a processor that, when instructions are executed by the processor, performs:
    setting, based on a user instruction, the values of the items into the database stored in the memory, and
    selecting, based on a user instruction, identification information of one sheet from among the identification information of the plurality of sheets displayed on the display,
    wherein, based on the selection of the identification information, the display displays at least one of the items of which at least one value has been newly set and associated with the selected identification information to store into the database, and
    wherein the at least one item is displayed with the displayed identification information of the plurality of sheets.

2. The print control apparatus according to claim 1, wherein the memory stores the identification information of the one sheet and attribute information of the one sheet in association with each other, and wherein, based on the identification information selected, the display displays the attribute information of the one sheet and the items whose values are set by the setting.

3. The print control apparatus according to claim 1, wherein the printing apparatus includes identification information of a sheet memory, wherein the identification information of the one sheet is stored in the sheet memory, wherein the memory stores the identification information of the sheet memory included in the printing apparatus and the identification information of the one sheet stored in the sheet memory in association with each other, and wherein the display displays the identification information of the sheet memory and the identification information of the one sheet in association with each other.

4. The print control apparatus according to claim 2, wherein the attribute information of the one sheet includes at least one of the following: a size, grammage, a type, and color of the one sheet stored in the sheet memory.

5. The print control apparatus according to claim 1, wherein the display does not display, from among a plurality of the items, the items of which values are not set.

6. The print control apparatus according to claim 1, wherein the items are items for determining an operating condition of the printing apparatus in a case where the printing apparatus prints an image on a sheet identified by the identification information of the one sheet.

7. The print control apparatus according to claim 1, wherein selecting includes performing mouse-over on identification information of one sheet from among the identification information of the plurality of sheets displayed on the display.

8. The print control apparatus according to claim 1, wherein the selecting is a first selecting, wherein the processor, when instructions are executed by the processor, further performs a second selecting to select, unlike the first selecting, identification information of a second sheet from the identification information of the plurality of sheets, and wherein, in response to the identification information of the second sheet being selected by the second selecting, the display displays an adjustment screen for setting values of the items corresponding to the selected identification information of the second sheet.

9. The print control apparatus according to claim 8, wherein the adjustment screen is a screen for displaying, from among the plurality of items, both the items of which values are set and the items of which values are not set.

10. The print control apparatus according to claim 8, wherein the second selecting includes receiving a click on one of the identification information of the plurality of sheets displayed on the display.

11. The print control apparatus according to claim 1, wherein the display displays a tooltip which indicates the items of which values are set by the setting.

12. The print control apparatus according to claim 1, wherein, in response to selecting identification information of a first sheet, the display displays, from among values stored in association with the identification information of the first sheet, at least one of items of which values set by the setting are stored, wherein, in response to selecting identification information of a second sheet, the display ends displaying the items associated with the identification information of the first sheet, and wherein the display is configured to display, from among the values stored in association with the identification information of the second sheet, the items of which values set by the setting are stored.

13. The print control apparatus according to claim 1, wherein, when the instructions are executed by the processor, the processor performs receiving a user instruction for selecting, from among the items, the items displayed based on selection by the selecting, and
wherein, in response to selecting identification information of a first sheet, the display displays, from among the items selected based on the received user instruction, the items of which setting values are set by the setting.

14. The print control apparatus according to claim 1, wherein the processor, when instructions are executed by the processor, further performs receiving a user instruction for setting a display order of displaying the items of which values are set by the setting unit, and
wherein, in response to identification information of a first sheet being selected, the display displays, from among the setting values associated with the identification information of the first sheet, the items of which values are set in the order selected by the received user instruction.

15. The print control apparatus according to claim 1, wherein the memory stores default values of the values of the items,
wherein the processor, when instructions are executed by the processor, further performs selecting items to be displayed on the display, based on the values of the items associated with the selected identification information of the one sheet and the default values of the items.

16. The print control apparatus according to claim 1, wherein the identification information of the one sheet is a name of the sheet.

17. A method for controlling a print control apparatus to communicate with a printing apparatus, the method comprising:
storing, in a database stored in a memory, identification information of a plurality of sheets and values of a plurality of items, wherein a piece of identification information among the identification information is associated with at least one of the values;
displaying the identification information of the plurality of sheets stored in the memory;
setting, based on a user instruction, the values of the items into the database stored in the memory; and
selecting, based on a user instruction, identification information of one sheet from among the identification information of the plurality of sheets displayed on the display,
wherein, based on the selection of the identification information, displaying includes displaying at least one of the items of which at least one value has been newly set and associated with the selected identification information to store into the database, and
wherein the at least one item is displayed with the displayed identification information of the plurality of sheets.

18. A non-transitory computer-readable storage medium storing a program to cause a computer to perform a method for controlling a print control apparatus to communicate with a printing apparatus, the method comprising:

storing, in a database stored in a memory, identification information of a plurality of sheets and values of a plurality of items, wherein a piece of identification information among the identification information is associated with at least one of the values;
displaying the identification information of the plurality of sheets stored in the memory;
setting, based on a user instruction, the values of the items into the database stored in the memory; and
selecting, based on a user instruction, identification information of one sheet from among the identification information of the plurality of sheets displayed on the display,
wherein, based on the selection of the identification information, displaying includes displaying at least one of the items of which at least one value has been newly set and associated with the selected identification information to store into the database, and
wherein the at least one item is displayed with the displayed identification information of the plurality of sheets.

19. An information processing apparatus to communicate with a printing apparatus, the information processing apparatus comprising:
a display;
a memory; and
a processor, when instructions are executed by the processor, performs:
holding, in a database in the memory, sheet information including a predetermined sheet setting, wherein the sheet information is associated with a sheet holding unit of the printing apparatus,
setting a control setting to control an operation of a printer engine of the printing apparatus that is associated with the held sheet information, wherein the control setting and the predetermined sheet setting are different types of settings,
displaying a display including display objects indicating sheet holding units,
indicating one display object corresponding to one of the sheet holding unit from the display objects, and
displaying the newly set control setting which is associated with the sheet information in accordance with the indication of the display object corresponding to the one of the sheet holding unit.

20. A method for an information processing apparatus to communicate with a printing apparatus, the method comprising:
holding, in a database in the memory, sheet information including a predetermined sheet setting, wherein the sheet information is associated with a sheet holding unit of the printing apparatus;
setting a control setting to control an operation of a printer engine of the printing apparatus that is associated with the held sheet information, wherein the control setting and the predetermined sheet setting are different types of settings;
displaying a display including display objects indicating sheet holding units;
indicating one display object corresponding to one of the sheet holding unit from the display objects; and
displaying the newly set control setting which is associated with the sheet information in accordance with the indication of the display object corresponding to the one of the sheet holding unit.

* * * * *